United States Patent
El-Siblani et al.

(10) Patent No.: US 10,632,732 B2
(45) Date of Patent: Apr. 28, 2020

(54) METHOD AND APPARATUS FOR MAKING THREE-DIMENSIONAL OBJECTS USING A DYNAMICALLY ADJUSTABLE RETAINING BARRIER

(71) Applicant: 3Dbotics, Inc., Dearborn, MI (US)

(72) Inventors: Ali El-Siblani, Dearborn Heights, MI (US); James Bredt, Watertown, MA (US); Kate Van Rees, Needham, MA (US); Alexandr Shkolnik, Los Angeles, CA (US)

(73) Assignee: 3Dbotics, Inc., Dearborn, MI (US)

( * ) Notice: Subject to any disclaimer, the term of this patent is extended or adjusted under 35 U.S.C. 154(b) by 449 days.

(21) Appl. No.: 15/346,324

(22) Filed: Nov. 8, 2016

(65) Prior Publication Data

US 2018/0126668 A1  May 10, 2018

(51) Int. Cl.
  *B33Y 30/00* (2015.01)
  *B29C 64/165* (2017.01)
  *B29C 64/255* (2017.01)
  *B33Y 10/00* (2015.01)

(52) U.S. Cl.
  CPC ............ *B33Y 30/00* (2014.12); *B29C 64/165* (2017.08); *B29C 64/255* (2017.08); *B33Y 10/00* (2014.12)

(58) Field of Classification Search
  CPC ..... B29C 64/255; B29C 33/42; B29C 64/165; B29C 64/25; B33Y 10/00; B33Y 30/00
  See application file for complete search history.

(56) References Cited

U.S. PATENT DOCUMENTS

| 6,682,688 B1* | 1/2004 | Higashi ................ B22F 3/1055 264/497 |
|---|---|---|
| 8,727,672 B2 | 5/2014 | Ederer et al. |
| 9,149,870 B2* | 10/2015 | Minick ................ B22F 3/1055 |
| 9,242,413 B2 | 1/2016 | Hartmann et al. |
| 9,440,397 B1* | 9/2016 | Fly .......................... B33Y 10/00 |
| 2005/0003189 A1* | 1/2005 | Bredt .................... C08L 101/00 428/402 |
| 2005/0280185 A1 | 12/2005 | Russell et al. |
| 2006/0192315 A1* | 8/2006 | Farr ..................... B29C 64/165 264/113 |
| 2007/0126157 A1* | 6/2007 | Bredt .................... B33Y 40/00 264/334 |
| 2008/0036117 A1 | 2/2008 | Hickerson et al. |
| 2009/0236778 A1* | 9/2009 | Boot ..................... B29C 64/135 264/572 |

(Continued)

FOREIGN PATENT DOCUMENTS

| EP | 0644809 B1 | 7/2001 |
|---|---|---|
| JP | 2013176893 A | 9/2013 |
| WO | 2014137637 A1 | 12/2014 |

OTHER PUBLICATIONS

International Search Report and Written Opinion for PCT/US2017/059863 dated Jun. 8, 2018.

*Primary Examiner* — Peter L Vajda
*Assistant Examiner* — Caroline Montiel
(74) *Attorney, Agent, or Firm* — Hansen IP Law PLLC

(57) ABSTRACT

Methods and apparatuses for making three-dimensional objects from a bindable powder are shown and described. A dynamically erected and/or expanded retaining barrier is provided which is erected and/or expanded during an object building operation to retain dispensed powder.

13 Claims, 22 Drawing Sheets

(56) References Cited

U.S. PATENT DOCUMENTS

| | | | |
|---|---|---|---|
| 2011/0293771 A1* | 12/2011 | Oberhofer | B22F 3/1055 425/182 |
| 2012/0234671 A1 | 9/2012 | Ackelid | |
| 2013/0234355 A1* | 9/2013 | Hartmann | B22F 3/1055 264/113 |
| 2014/0077422 A1* | 3/2014 | Minick | B22F 3/1055 264/497 |
| 2015/0110910 A1* | 4/2015 | Hartmann | B29C 64/20 425/78 |
| 2015/0246485 A1 | 9/2015 | Guenster et al. | |
| 2015/0258744 A1* | 9/2015 | Muller | B08B 7/028 264/37.29 |
| 2016/0158962 A1 | 6/2016 | Balistreri et al. | |
| 2016/0368050 A1* | 12/2016 | Morris | B33Y 10/00 |
| 2017/0050378 A1 | 2/2017 | Ederer et al. | |
| 2017/0165754 A1 | 6/2017 | Buller et al. | |
| 2018/0194063 A1* | 7/2018 | Zamorano | B33Y 30/00 |

* cited by examiner

FIG. 1A
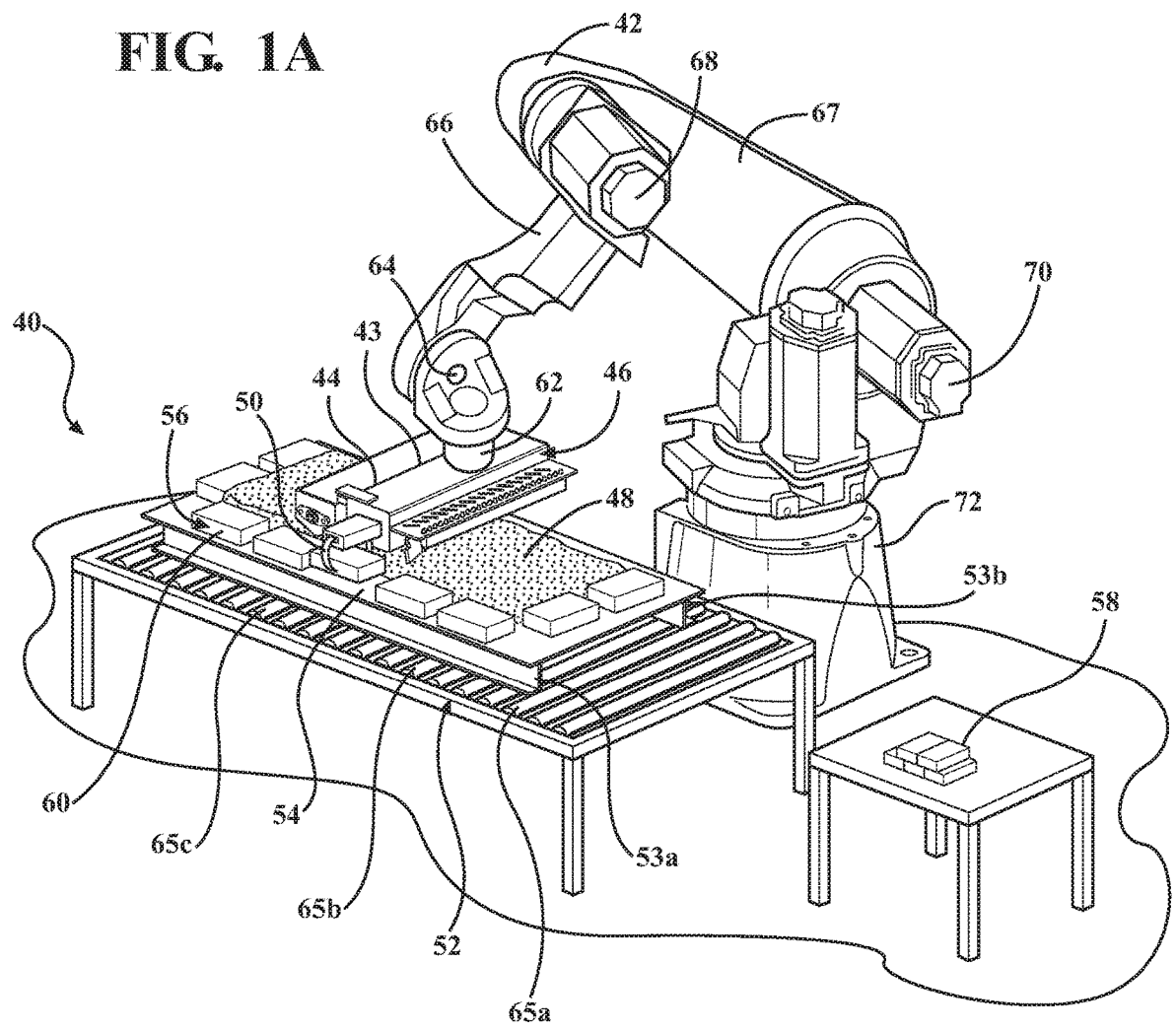
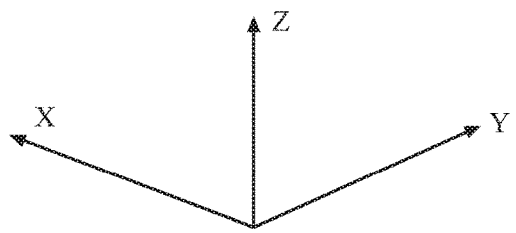

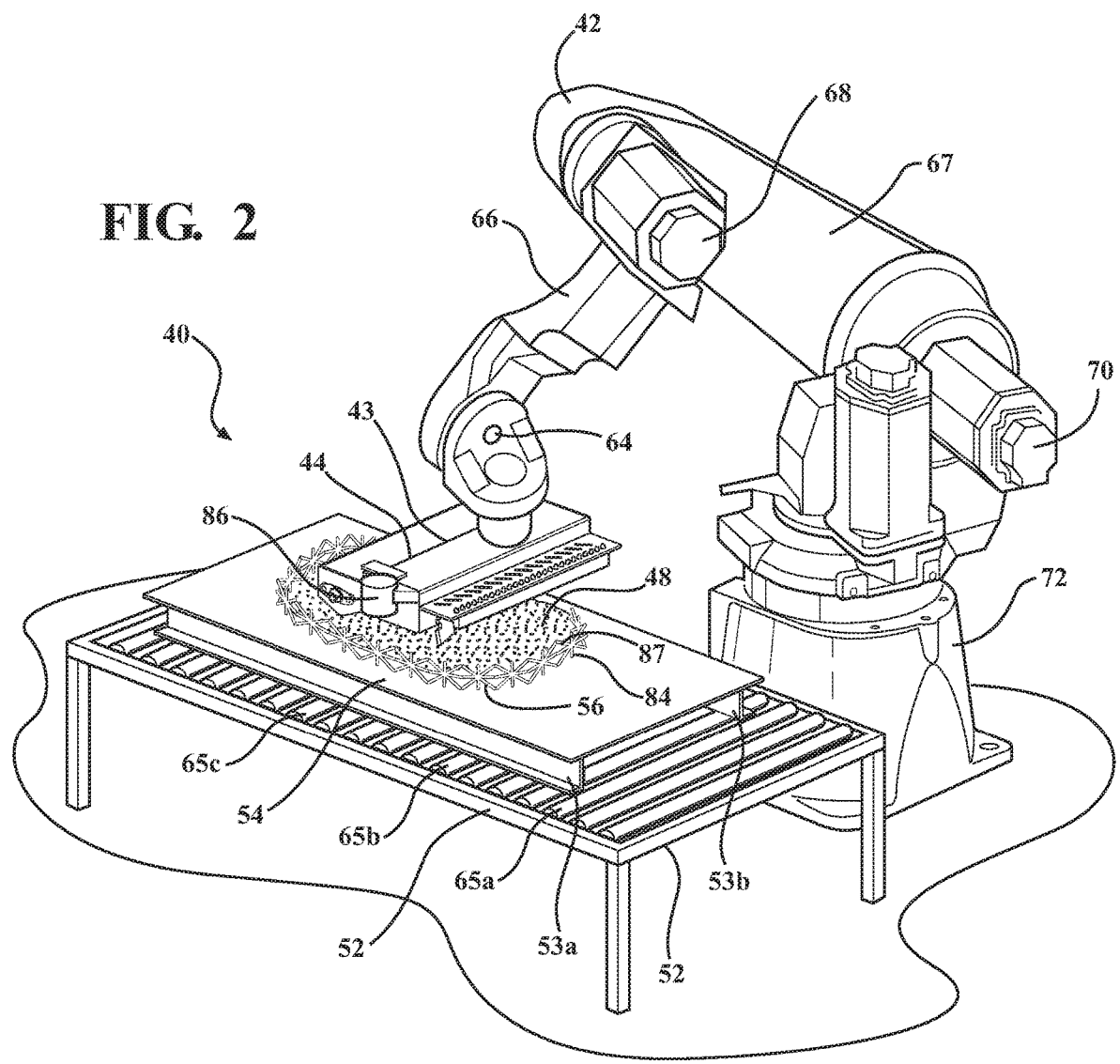
FIG. 2
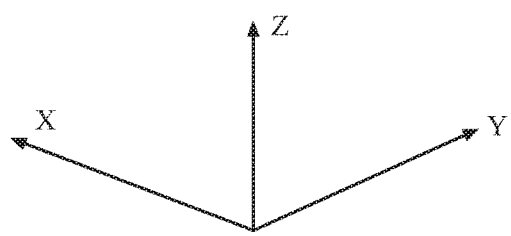

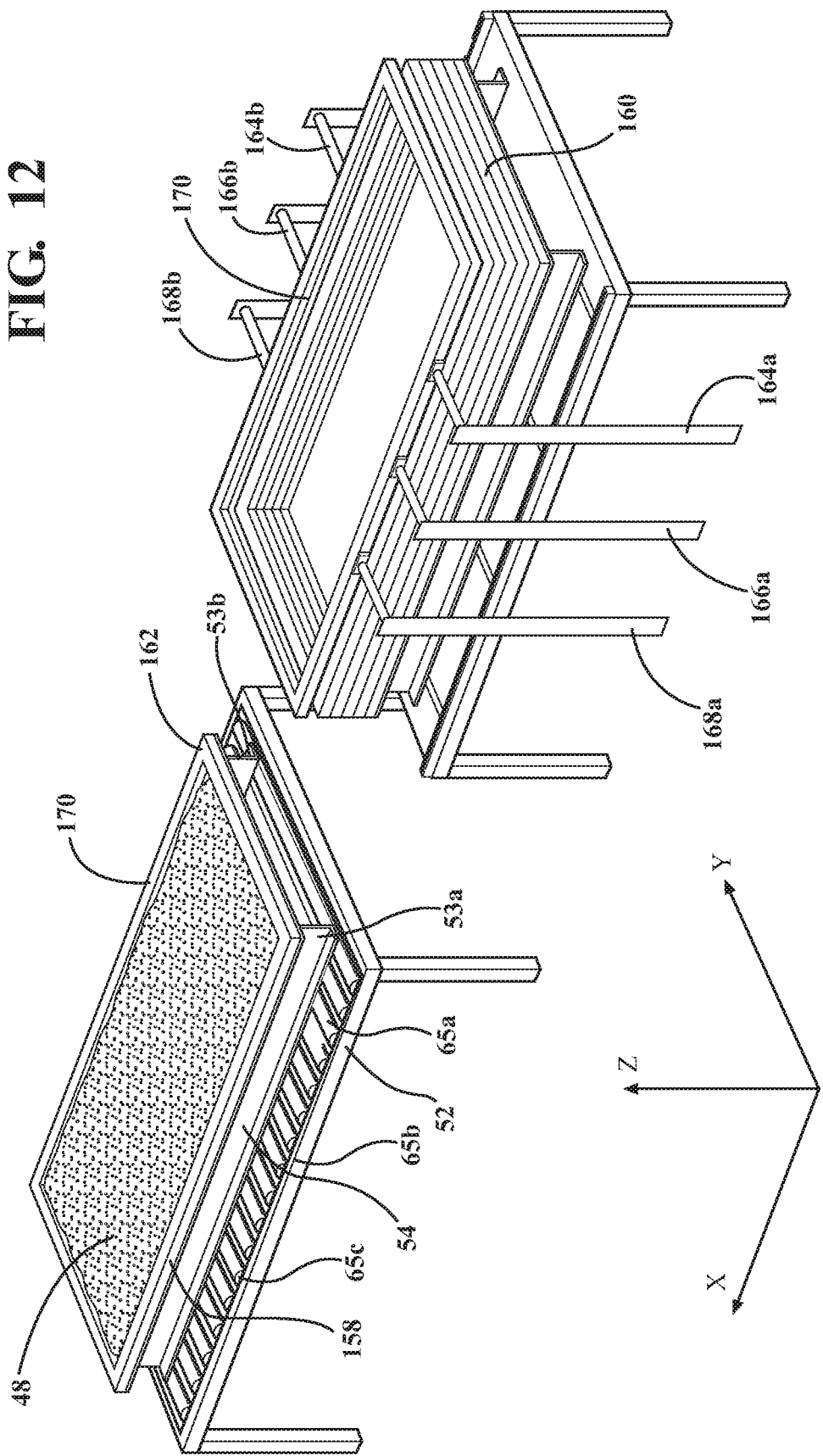

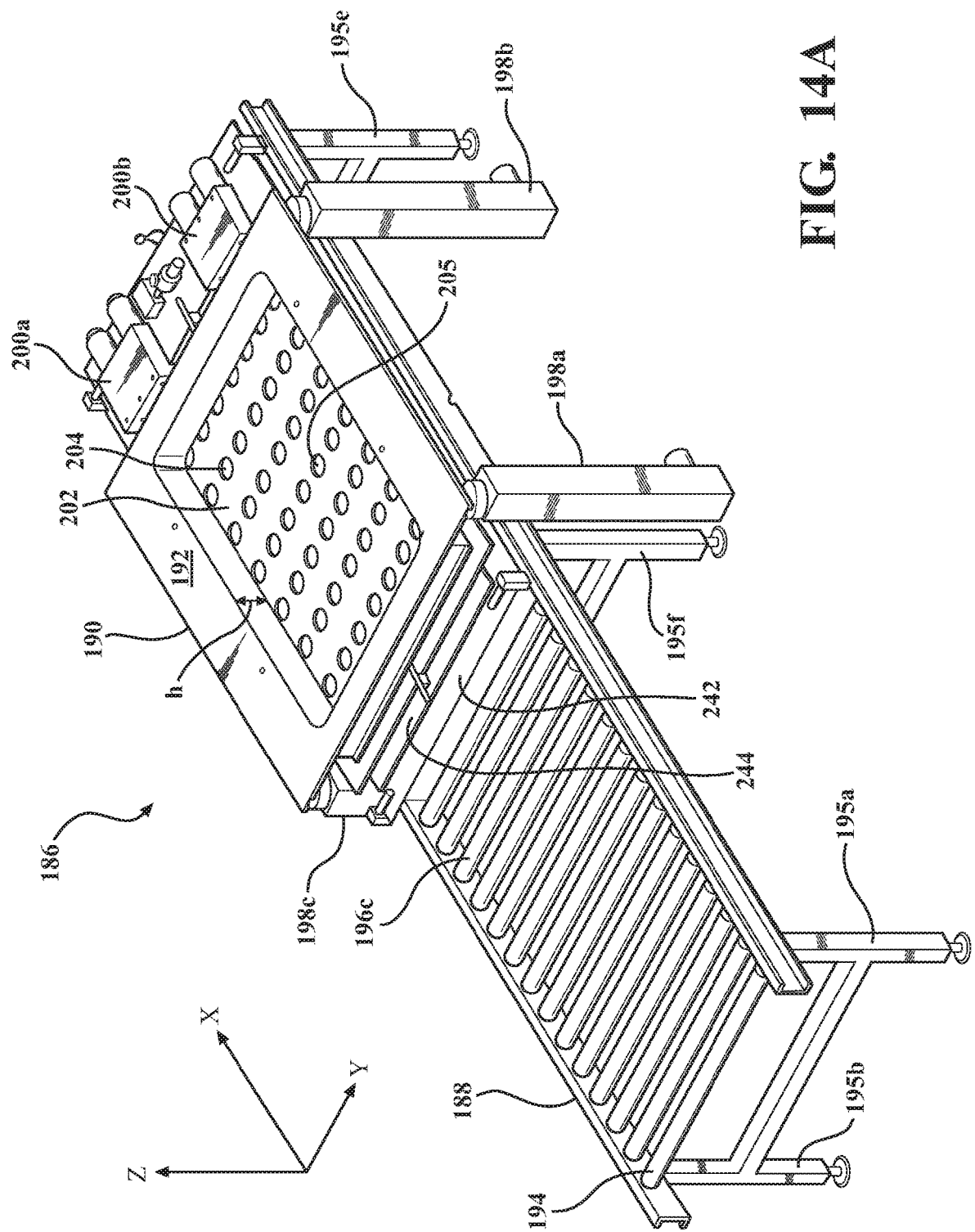

METHOD AND APPARATUS FOR MAKING THREE-DIMENSIONAL OBJECTS USING A DYNAMICALLY ADJUSTABLE RETAINING BARRIER

FIELD

The disclosure relates to a method and apparatus for making a three-dimensional object from powder and a binder using a dynamically adjustable retaining barrier, and more specifically, a retaining barrier that progressively expands the working volume while building a three-dimensional object.

DESCRIPTION OF THE RELATED ART

Three dimensional printers that use a powdered substrate are described for example, in U.S. Pat. Nos. 4,863,538; 5,147,587; 5,204,055; and 5,387,380. These machines operate through a cyclic sequence whereby a flowable powdered feed material is deposited by a spreading mechanism in a flat layer on a receiving surface; and subsequently a mechanism for selectively binding grains of powder is operated from above the receiving surface and bonds together a portion of the substrate into a thin layer in a pattern that coincides with a section of a solid object under construction. As a part of this cycle, one or more other optional mechanisms may be operated over the receiving surface, e.g. to color or otherwise modify the properties of the bonded layers. The cycle is repeated with an incremental motion that separates the spreading mechanism from the receiving surface, and a solid part is formed from the union of many layers that are bonded together.

The spreading mechanism may include a traveling powder dispenser, hopper, or dumper, and it may include a leveling device such as a sharp blade, a roller, or a blunt bar; any of which could be simply traveling in a line or vibrating during travel; and the roller could be driven by a motor in either direction, or it may be fixed or free-wheeling.

The bonding mechanism that acts upon the powdered substrate may be a focused laser beam, radiant heat from some other source, an inkjet printer dispensing a binder, or fluid dispenser supplying binder through a needle. Other bonding mechanisms include a combination of a binder and an activating agent wherein one component is printed onto the powder and the other is mixed with or coated onto grains of the powder.

A solid finished article produced by a 3D printer in the context of this invention comprises bonded particles of the powdered substrate, and may include solidified binder material dispensed by an inkjet printer or another fluid dispenser. The mechanical structure of the part is provided by bonds between grains of powder that have been caused to form by the bonding mechanism. These bonds may form immediately on application, but generally they develop over a period of time, for example, by cooling of material melted by a laser beam or by dissolution, drying, and possibly polymerization or crosslinking of components of the binder material.

The surface of the finished part is defined generally by the edges of the selected regions bonded together during each machine cycle; and the interior of the part is comprised of the enclosed regions inside the edges of each bonded layer. The outer surface may have the same composition and properties and functionality as the interior, or there may be a gradient in composition or properties or functionality between the exterior and the interior of the part, depending on differences between the edges and the enclosed regions formed in each layer. Such differences may be imposed by the spreading mechanism, the bonding mechanism, or other optional mechanisms that operate upon the individual layers during the build process.

In the earlier machines developed for this technology, for example, those produced by Z Corporation (now 3D Systems) in the mid-1990's, the receiving surface of the machine comprised a horizontal rectangular platform that could be indexed vertically, and the bonding mechanism was a drop-on-demand inkjet printer that traveled in a fixed plane. The flowable powdered feed material was contained within a four-sided rectangular build box with openings on the top and bottom. As the build process progressed, the piston gradually traversed downwards in the build box and was kept full by the spreading mechanism. The four stationary walls of the build box contained the powder within the machine and provided mechanical support for the powder surface as it was bonded together into layers.

While these machines were compact and reliable, the addressable (maximum) powder receiving area was a fixed size, and it was required to fill the receiving volume (defined by the receiving area times the height of the part) with feed material whether or not that volume was fully populated with parts under construction. This led to waste of build material, and limited the size of parts these machines could construct to the envelope contained by the build box.

Other known techniques included the use of an open receiving surface with powder contained by a free-standing retaining barrier that was constructed on the 3D printer from the same material at the same time as the desired three-dimensional object. This enabled a 3D printer to construct parts with less wasted material by allowing the receiving volume to be adjusted to a margin surrounding the parts without the limiting aspects of a fixed build box. Walls could be vertical or inclined, and the further use of a dispensing mechanism that operated within an adjustable area permitted the receiving volume of the machine to be infinitely variable, with very good economy in materials.

One unfortunate shortcoming in this method was that the support provided by the 3D printed retaining barriers was needed immediately upon printing in order to adequately stabilize the build material from one layer-generating cycle to the next. This placed a severe constraint on the rate of strength development of the build material. In the thermally solidified implementations of the process, e.g. laser sintering, the strengthening of the bonded material is determined by the rate of heat application and cooling of the build material. In chemically solidified implementations of the process, e.g. ink-jet printing, the strengthening of the bonded material is determined by the rate of chemical reactions between the printed liquid binder and the powder, or the rate of dissolution and drying in a solvent-based process. To meet a specific requirement for hardening rate, i.e. that determined by the construction of a free-standing retaining barrier, the process developer is limited to choices of materials that react at the specified rate.

In many aspects of 3D printing the quality of the final product is compromised if the rate of solidification or strengthening is either too fast or too slow. If the strengthening is too fast, there is insufficient time for adjacent layers to thoroughly bond to each other. If the strengthening is too slow, the parts can distort under the action of the spreading mechanism or, in extreme cases parts may not survive removal and handling after the build process is complete. These characteristics are inherent to the physics of the overall build process. For example, in a liquid binder process the bonding between layers is controlled by the viscosity of the fluid and the capillary attraction of the powder.

A need has arisen for an apparatus and method for making three-dimensional objects by binding a powder which addresses the foregoing issues.

BRIEF DESCRIPTION OF THE DRAWINGS

The disclosure will now be described, by way of example, with reference to the accompanying drawings, in which:

FIG. 1A is a perspective view of an apparatus for making a three-dimensional object by binding a powder wherein bricks are used to dynamically construct a retaining barrier during an object building process;

FIG. 2 is a perspective view of an apparatus for making a three-dimensional object wherein interlocking barbed members are used to dynamically construct a retaining barrier during an object building process;

FIG. 12 is a perspective view of an apparatus for making a three-dimensional object wherein a plurality of frames is used to dynamically build a retaining barrier during an object building process;

FIG. 14A is a perspective view of an apparatus for making a three-dimensional object comprising a vertically expandable and retractable retaining barrier in a first, fully retracted configuration;

DETAILED DESCRIPTION

Figure 1B:
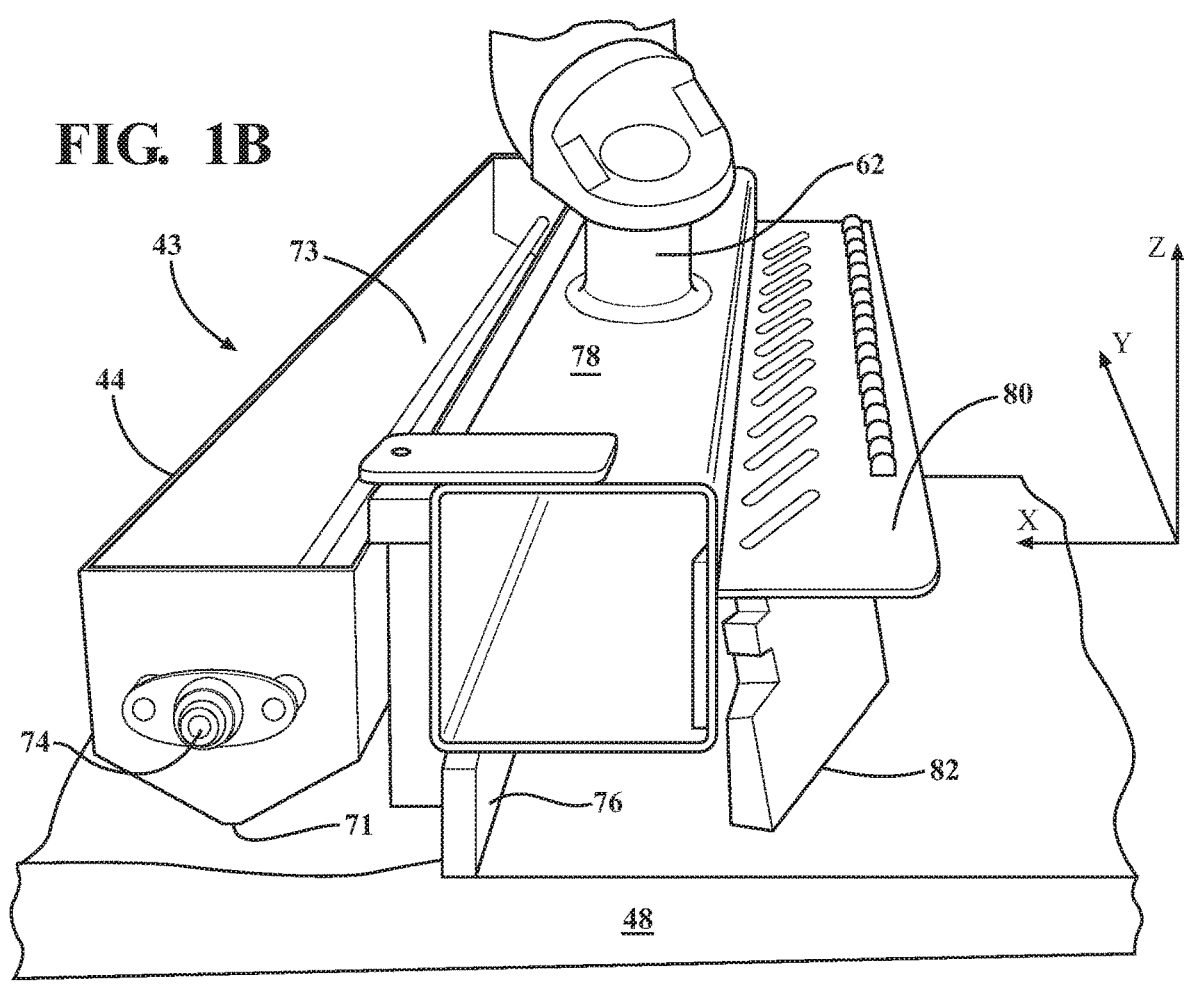
FIG. 1B is a side view of a print engine comprising a powder dispenser and binder printer useful in the apparatuses for making three-dimensional objects described herein.

In accordance with examples herein, a 3D printer based on an industrial robot incorporates a powder dispenser and a binder dispenser on the end-effector of the robot. The powder dispenser may be configured to drop and level material for the powdered substrate in a single motion, or the operations may be separated into different motions. In either case, it is desirable to contain as much as possible of the powdered substrate upon the powder receiving surface of the machine. In older technology 3D printers this is accomplished by holding the substrate in a box with a moveable bottom. Parts are thus built inside the box by a sequential process of spreading powder, printing on the flat surface left by the spreader, and indexing the box bottom downwards by the thickness of the layer.

This method is convenient for situations where the mass of the printed object is less than or equal to the mass of the spreading and printing mechanisms. The spreader and printing engine may be carried on a gantry system that moves in a horizontal plane, while the vertical axis is provided by a linear motion system, or a jack, that raises or lowers the volume contained in the build box. For building larger parts, it becomes more convenient to accurately move the spreader and printer in all three axes and to keep the receiving surface stationary. Parts are built upwards from a receiving surface that may be permanently fixed, as in the case of a stationary table top; or removable, by use of a moveable pallet that includes a receiving surface that can be shifted away from the machine at the conclusion of the build process.

While it may be possible, in some cases, to build 3D printed parts that fit within a conical volume described by the edges of the receiving surface and the angle of repose of the powder, it is far more useful to build within a rectilinear volume and to provide some means by which powder can be contained within a region with vertical sides, or at least a region with steeply sloping sides.

In an aspect, this disclosure describes a method for producing 3D printed components making economical use of the build material by allowing the receiving volume in the machine to be adjusted. In another aspect, an apparatus is provided which to enables the production of 3D printed components without the use of a rigid build box and without requiring the components to be free-standing on a receiving surface. In still another aspect, a method is provided which utilizes different hardening materials to provide a spatial hardening gradient, wherein the outside surfaces of one or a group of 3D printed components exhibit a hardening rate that differs from the hardening rate of the internal regions of the build. In still another aspect, a method is provided for removing and handling 3D printed parts after completion of the build process.

The term "build process" refers to the action of the 3D printer during its operation. The product of that operation is referred to by the term "build." This includes the 3D printed component as well as loose materials, support structures, and other components that were not present when the build process was begun. As the build process progresses, material is formed in a sequence of cross-sectional portions called "layers" in a direction defined as the "build (z) axis." The sequential increment along the build (z) axis for the formation of layers is the "object layer thickness" or "$\Delta z$." At an intermediate point during the formation of an object layer there is a plane in space called the "dispensing plane" that coincides with the plane of action of the powder dispensing mechanism. It defines a horizontal plane below which any obstacles to the motion of the printer have no effect. Alternatively, obstacles that project above the dispensing plane may collide with the dispensing or printing mechanisms and impede the build process.

The term "receiving surface" refers to a surface on which solidifiable powder is dispensed that forms a base for the build process. It rests below the print plane from the very start of the build process, and its lateral extents are defined by the dimensional limits of the powder dispensing operation. The receiving surface may comprise a portion of the top of a static table or a portion of the upper surface of a movable pallet. A subset of the receiving surface is the "object build area" where both powder dispensing and solidification are possible. Generally it is necessary to dispense powder outside the region through where material may be solidified; the object build area defines the portion of the receiving surface above which the build process is effected.

There exist two planes of action that step upwards during the build process. One of these is the "dispensing plane" that coincides with the upper surface of the previously printed layer. The other plane is the "print plane" that coincides with the plane formed after dispensing and leveling a layer of fresh powder on top of the dispensing plane. During the period after dispensing and leveling but before printing of the current layer, these two planes are spaced apart by one object layer thickness $\Delta z$. At all other times the two planes coincide with each other.

At any point after the start of the build process, the dispensing plane and the print plane sit at a height above the receiving surface in the build (z) axis direction. Both planes advance upwards in increments of the object layer thickness. The "receiving area" is the area on the dispensing plane where powder lands from the dispenser, and it coincides with the projection of the receiving surface onto the dispensing plane. The "receiving volume" comprises the volume of space defined by the receiving area (on the dispensing plane) projected downward to the plane of the receiving surface. This is equal to the product of physical area (in x and y) of the receiving surface times the height of the print plane (z) above the receiving surface.

The region comprising the projection of the object build area at the height of the print plane is the surface where the solidification of the 3D printed part is effected and it is therefore of prime interest in descriptions of the build process. This region is hereinafter called the "build surface." The build surface advances upwards following the formation of any given layer as a new surface is created by the spreading mechanism.

The receiving surface generally comprises a portion of the top of a table or plate that supports the build material during the build process. The term "build table" hereinafter signifies a stationary support that may incorporate the receiving surface as a portion of its upper surface; or it may be a support for a moveable component, hereinafter described as a "build pallet" that itself may incorporate the receiving surface as a portion of its upper surface. The build table may incorporate a conveyer that facilitates motion of the receiving volume away from the machine at the completion of the build process.

In accordance with certain examples, a 3D printer is provided which comprises a robot, a printhead, a powder dispensing and spreading mechanism, and a receiving surface. The term "printing engine" is used hereinafter to describe the combination of powder dispenser, printhead, and other devices carried by the robot over the receiving surface, as discussed further below with respect to FIG. 1B.

In examples herein, a dynamically expandable and retractable retaining barrier is provided and is dynamically expanded or extended vertically during an object building process to accommodate the receiving volume. In other examples, retaining barrier components are provided and a retaining barrier component positioner is provided and is used to dynamically erect the retaining barrier during an object building process. Other examples may further comprise a secondary material dispenser that travels with the printhead and a structure formed from the material dispensed that at least partially encloses the object build area.

In some examples, the retaining barrier component positioner is a gripping and positioning mechanism used to dynamically construct the retaining barrier from retaining barrier components comprising small solid articles. Other examples comprise a second robot with a second gripping apparatus and a set of objects positioned by the second robot in the object build area. Still other examples further comprise a 3D printed structure with a gradient in mechanical properties that directs motion of powder or stress in a body of powder away from other components under construction in the object build area.

In an embodiment of this invention, a flat build pallet serves as the receiving surface and one or more layers of powder are deposited and leveled on this surface prior to commencing the build. In a margin surrounding the active object build area, a retaining barrier such as a wall or fence may be placed to prevent an excess of powder from spilling off the edge of the pallet. The retaining barrier can be built manually by the operator, constructed by the robot, or it can be erected by another mechanism that resides outside the object build area.

A simple example is for the machine operator to place a ring of bricks around the perimeter of the object build area to prevent powder from spilling off the edges of the receiving surface. The top surface of the brick wall must be at least slightly below the working plane of the printer (the print plane) at every stage of the process, so a wall with several courses of bricks may be built up sequentially during the object build process as the print plane elevates further above the receiving surface. A robot may be programmed to assemble a wall under automatic control by picking up bricks from a storage location outside of the receiving area and placing them around the perimeter. Preferably, there is a separation or margin between the outer limits of the receiving area and the outer limits of the object build area so that the object is not built immediately adjacent to or in contact with the retaining barrier. Bricks, sheets, or cards may be placed in any combination and in any pattern disposed above the receiving surface and thereby they can be used to adjust the size of the object build area so it conforms to the local boundary of the set of parts under construction.

The process of constructing or placing a retaining barrier after a pile of powder has begun to form may cause distortion of the body of powder, especially in close proximity to the margins of the support. Another example includes a secondary barrier that may be printed by the 3D printer in the space between the retaining barrier and the parts under construction. This secondary barrier is partly supported by the external wall and its purpose is to confine the movement of powder caused by the deployment of the retaining barrier to an area well outside the object build area. The material comprising this secondary barrier may be formed from the material deposited by the 3D printer or it may comprise some other material applied by an additional dispenser specialized to the task.

Figure 15A:
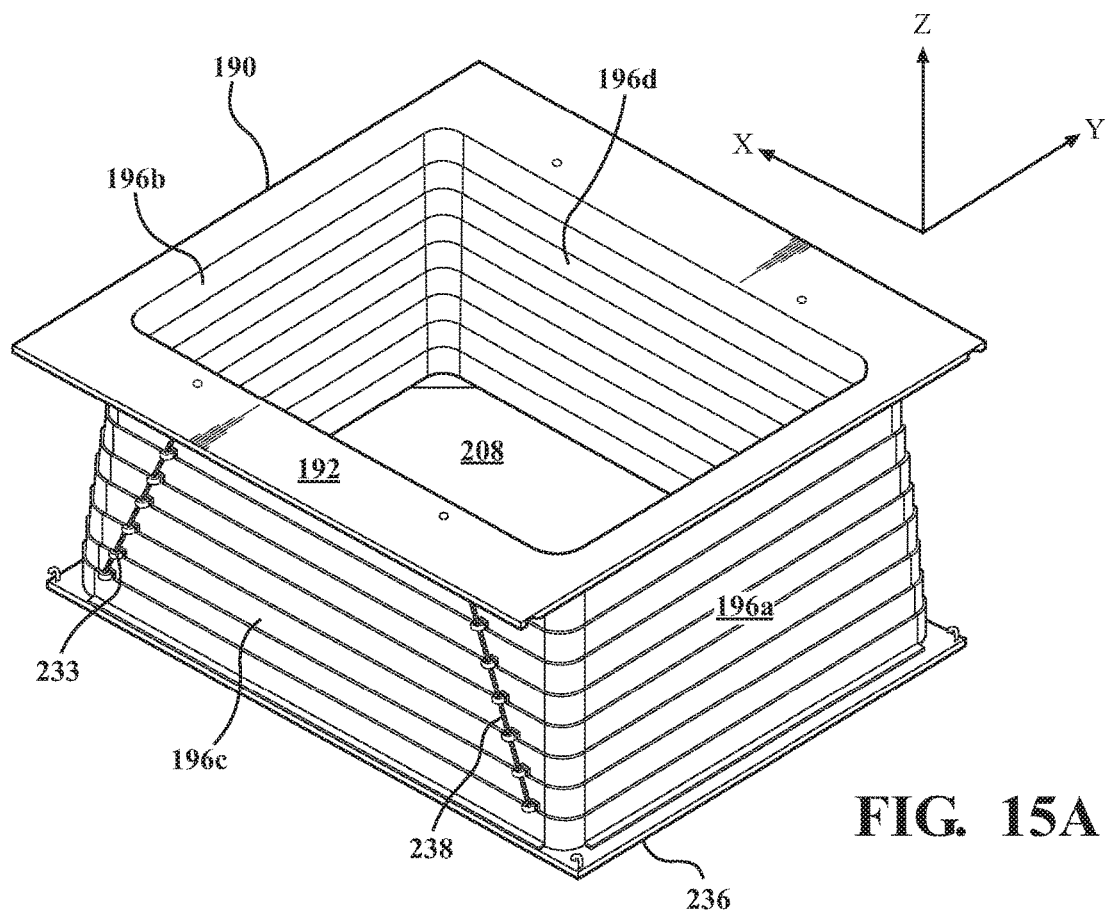
FIG. 15A is a perspective view of the vertically expandable and retractable retaining barrier of FIG. 14B in the second, fully expanded configuration.
Figure 15B:
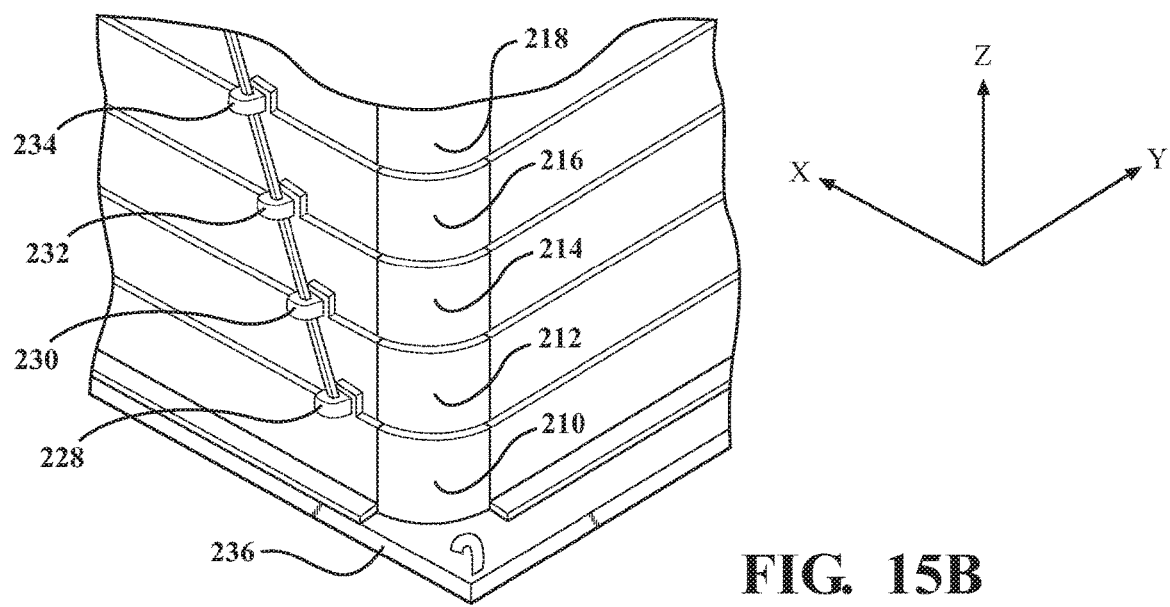
FIG. 15B is a close-up view of the vertically expandable and retractable retaining barrier of FIG. 15A showing interlocking connecting members.
Figure 15C:
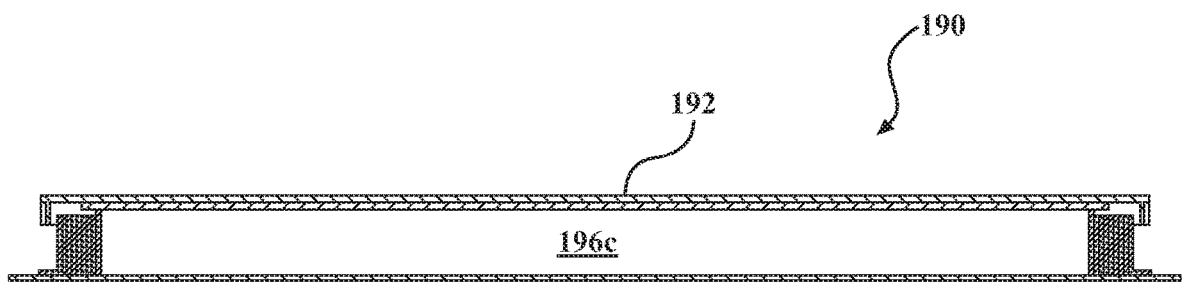
FIG. 15C is a side elevation view of the vertically expandable and retractable retaining barrier of FIG. 15A in a fully retracted configuration.
Figure 15D:
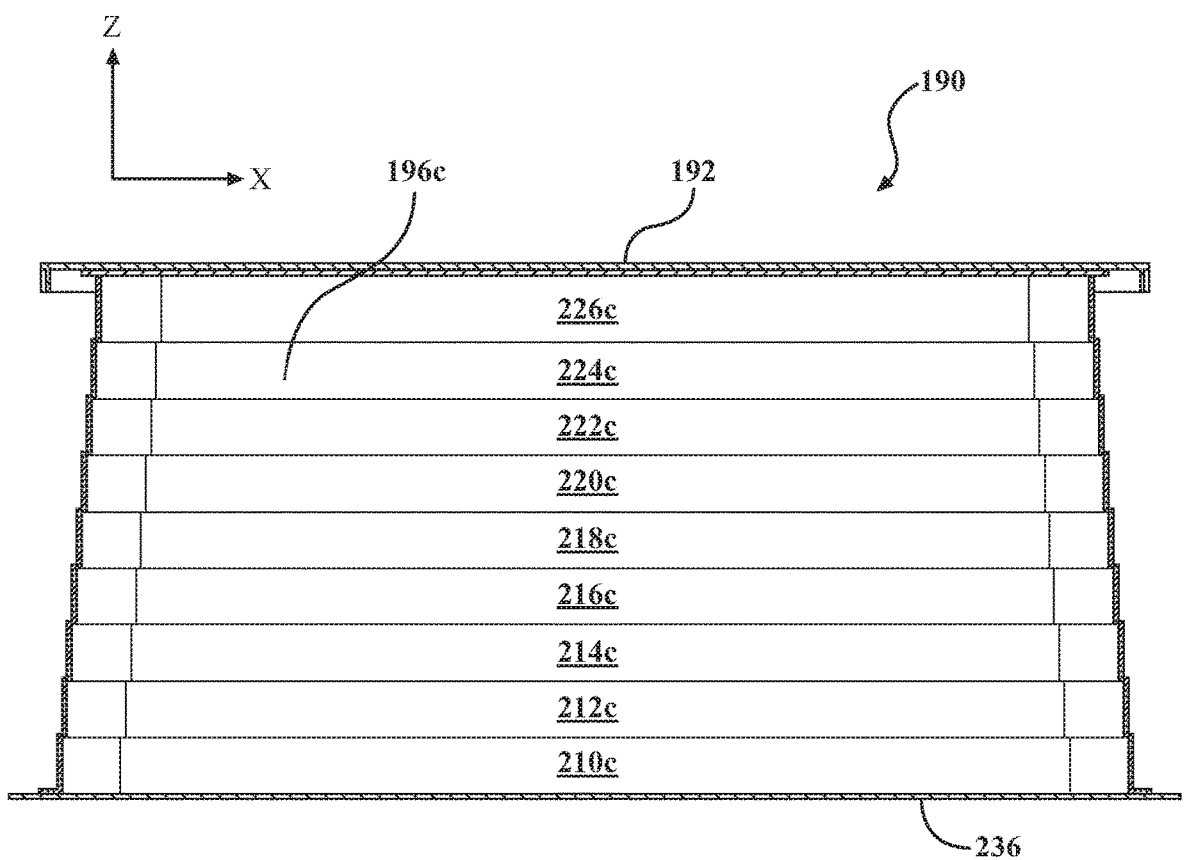
FIG. 15D is a side elevation view the vertically expandable and retractable wall of FIG. 15A in a fully expanded configuration.
Figure 15E:
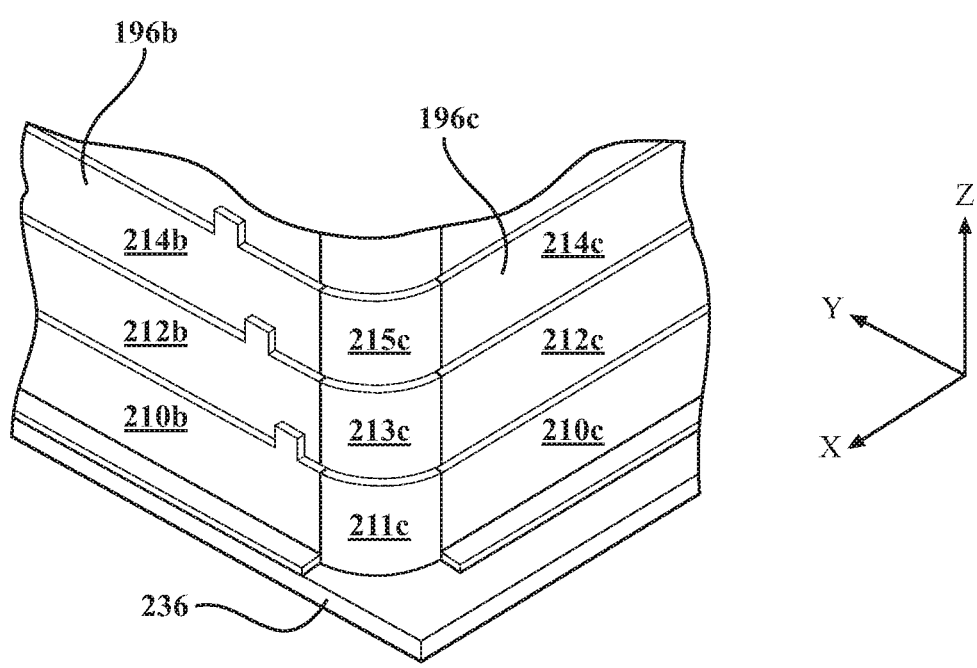
FIG. 15E is a close-up view of a corner of the vertically expandable and retractable retaining barrier of FIG. 15A in a fully expanded configuration.
Figure 16B:
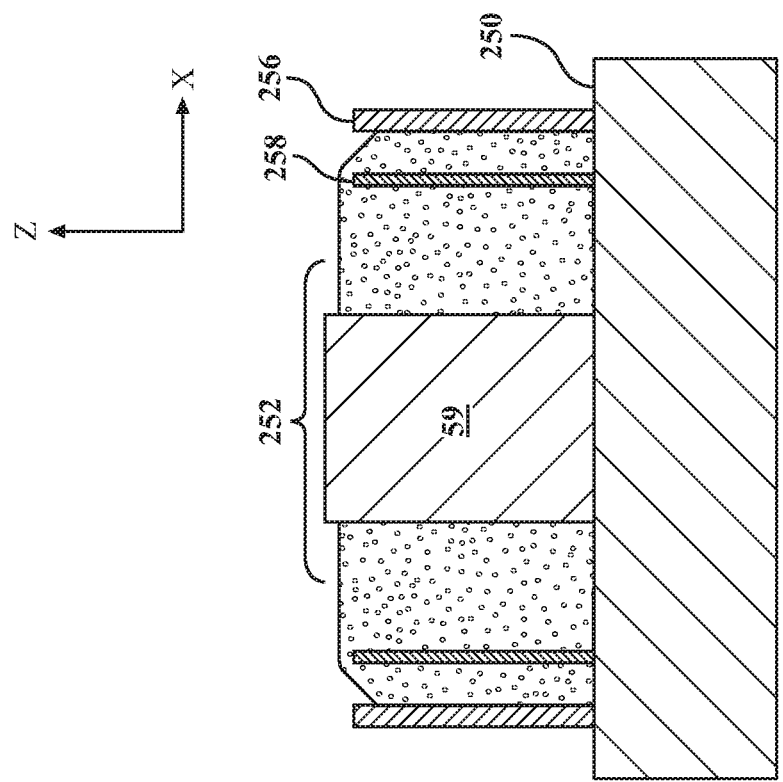
FIG. 16B is a side elevation view of FIG. 16B.
Figure 16A:
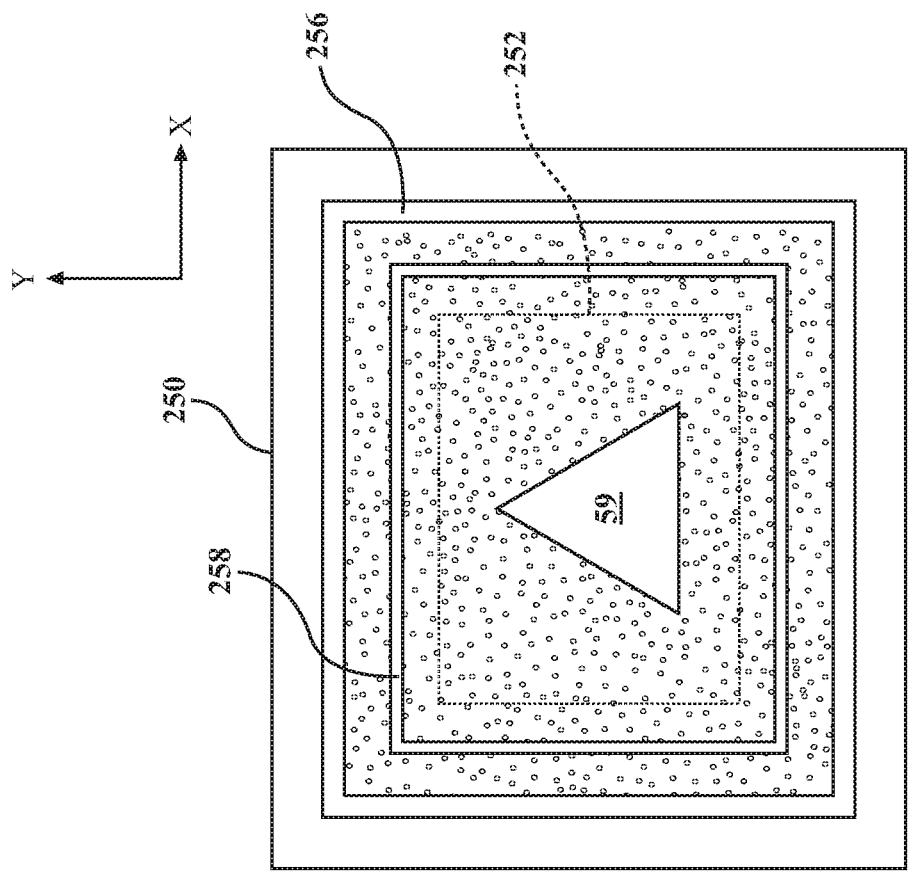
FIG. 16A is a top plan view of an object within primary and second retaining barriers.

Referring to FIGS. 16A and 16B, receiving surface 250 is provided and includes an object build area 252. Primary retaining barrier 256 is made of a material other than the powder used to form three-dimensional object 59 and may comprise, for example, any of the retaining barriers 56 (FIGS. 1A-B, 2) 90 (FIG. 3), 100 (FIG. 4), 104 (FIG. 5), 114 (FIGS. 6A-B), 125 (FIG. 7), 130 (FIG. 8), 142 (FIG. 9), 146 (FIGS. 10A-B), 148 (FIG. 11), 158 (FIG. 12, 176 (FIGS. 13A-D), and 190 (FIGS. 15A-E). Secondary barrier 258 is preferably made of the powder used for form object 59 and may use the same binder or a different binder. Secondary barrier 258 may wholly or partially enclose object build area 252 and object 59, and primary barrier 256 may wholly or partially enclose secondary barrier 248, object build area 252 and object 59.

Build material forming the secondary barrier need not be fully solidified in order to confine movement of powder, and the secondary barrier need not be free-standing or constrained to solidify at a high rate. It is necessary, however, that the secondary barrier be cohesive to a degree that deformation in the loose powder adjacent to the outermost retaining barrier is deflected away from the object build area. The secondary barrier thus embodies a form of functionally-gradient material: The material comprising the secondary barrier is formed in such a composition that it may not be as strong as the parts being built in the object build area, and it may have a composition so chosen to solidify at a rate planned to be faster or slower than the solidification of the desired parts. The secondary barrier may be of such a composition that the angle of repose of the powder is increased so that a steeper slope than the unmodified angle of repose may be created in the powder in the margin between the object build area and the retaining barrier without requiring the material to be fully solid, or free-standing. Benefits to this are to increase the vertical margin allowable between the top of the retaining barrier and the current dispensing plane, less consumption of the binder material and as an aid to removing finished parts from the build.

A functional retaining barrier may comprise elements of both flexible and rigid designs. For example, a segmented fence may support the weight of the contained material effectively, but require the presence of a flexible liner to adequately contain the material at the corners, hinges, and joints.

Referring to FIG. 1A, a first example of an apparatus 40 for making a three-dimensional object by selectively binding a powder 48 is provided. The apparatus 40 forms a plurality of layers into patterns corresponding to cross-sections of the three-dimensional object being built. Apparatus 40 comprises a robot 42 with a base 72 at one end and a print engine 43 at the opposite end. Robot 42 comprises first articulating arm 66 and second articulating arm 67. First articulating arm 66 is connected to a print engine connector 62 that is pivotally connected to the distal end of the robot arm at pivot shaft 64. First articulating arm 66 is connected to second articulating arm 67 at pivot shaft 68. Second articulating arm 67 is connected to base 72 at pivot shaft 70. Base 72 is rotatable in the x-y plane to adjust the x-y position of first and second articulating arms 66 and 67 and print engine 43. At a given rotational angle of base 72 in the x-y plane, pivoting first arm 66 about pivot shaft 68 will adjust the x, y, and z position of print engine 43, as will pivoting second arm 67 about pivot shaft 70. Rotation of pivot shaft 64 allows the printing engine to assume different orientations about the z axis. Thus, robot 42 can position print engine 43 at a plurality of different x, y, and z locations with different orientations about the z-axis.

Referring to FIG. 1B, print engine 43 comprises a powder dispenser 44 with an open top 73 for receiving powder 48 (not shown). A plurality of openings 71 extend along the length of powder dispenser 44 and along the y-axis and discharges powder to a receiving area. The powder may be deposited onto a receiving surface, previously deposited loose powder, and/or a previously formed object layer. Rotating shaft 74 keeps the powder in powder dispenser 44 from forming clumps and facilitates the flow of powder through openings 71. Suitable powders 48 comprise particles that are any suitable finely divided material capable of being bonded to form an aggregate with an activated binder. The particles may be organic, inorganic, or a mixture thereof. They may be ceramic, metal, plastic, carbohydrate, small organic molecule, large organic molecule, and combinations thereof. Suitable particles include foundry sand, virgin sand, reclaimed sand, silica, quartz, zircon, olivine, magnesite, chromite, or combinations thereof.

Print engine 43 also comprises print head 80 with a plurality of print head orifices 82 (not visible but facing downward in FIG. 1B). Print head 80 is connected to powder dispenser 44 via bracket 78. Suitable print densities range from 20 dots per inch to 2000 dots per inch, most preferably 100 dots per inch to 400 dots per inch. The print head orifices 82 are spaced apart from one another and extend along the length of printhead 80 generally along the y-axis. The orifices 82 are in fluid communication with a source of a binder liquid. The binder may be any suitable material that is capable of firmly coupling adjoining particulates to each other. In a highly preferred aspect, the binder material is an organic compound, and more particularly an organic compound that includes molecules that cross-link or otherwise covalently bond among each other.

In a highly preferred embodiment, the preferred material for the binder includes at least one material selected from the group consisting of phenol resin, polyisocyanate, polyurethane, epoxy resin, furan resin, polyurethane polymer, phenolic polyurethane, phenol-formaldehyde furfuryl alcohol, urea-formaldehyde furfuryl alcohol, formaldehyde furfuryl alcohol, peroxide, polyphenol resin, resol ester, acrylic, vinyl, styrene, other unsaturated monomers and oligomers, or mixtures thereof.

Though other viscosities are possible, during dispensing through a print head, preferably, the viscosity of the binder material at an operating temperature between 20° C. and 60° C., most preferably 20° C., preferably ranges from 5 to about 60 cps, and more preferably 10 to 50 cps, and still more preferably about 14 to about 20 cps.

Smoothing blade 76 is a generally rigid rectangular blade having a length parallel to the length of powder dispenser 44 (along the y-axis) and is attached to bracket 78. Bracket 78 and smoothing blade 76 are positioned between the powder dispenser 44 and the printhead 80 along the travel (x) axis. Smoothing blade 76 has a height along the build (z) axis and extends beneath the openings 71 of powder dispenser 44 and the printhead orifices 82 of printhead 80. The powder 48 exiting powder dispenser 44 may not be smooth and level. Thus, blade 76 extends a short distance into the dispensed powder 48 to provide a substantially smooth and planar surface. As print engine 43 travels to the left in FIG. 1B, dispenser 44 dispenses powder 48 and smoothing blade 76 follows a short distance behind dispenser 44 to create a substantially planar exposed surface of powder 48.

When viewed along the build (z) axis, the print engine 43 traverses an arc during a powder dispensing operation and during a binder printing operation. In certain examples, powder dispensing and binder printing occur simultaneously, i.e., they both occur when the print engine 43 traverses a clockwise or counterclockwise arc when viewed along the build (z) axis, or in some other line in the x-y plane. In other examples, during one directional traverse of print engine 43, powder dispensing occurs and no binder printing occurs and during the opposite directional traverse, binder printing occurs and no powder dispensing occurs. In another example, when the print engine 43 is viewed along the build (z) axis, powder dispensing occurs when the powder dispenser 44 is ahead of the print head 80 in the direction of the print engine 43 traverse, and binder printing occurs when the print head 80 is behind the powder dispenser 44 in the direction of traverse. This technique provides more time for the dispensed powder 48 to stabilize after being smoothed by smoothing blade 76 before a binder printing operation is carried out. In other examples, powder deposition and binder printing may only occur when the print engine 43 is moving in one particular direction, but on opposite passes. This technique provides the greatest amount of settling time for the powder prior to printing the binder.

The powder 48 from powder dispenser 44 is initially dispensed onto a receiving surface 54 that includes an object build area. Receiving surface 54 is supported by a build table 52. As portions of the powder 48 are solidified, subsequent volumes of powder 48 are dispensed onto the dispensing surface (the upward facing, exposed surface of the most recently formed object layer) and in some cases, onto loose powder that has not been solidified. In certain examples, it is preferable to use robot 42 to solidify several objects, each on its own receiving surface 54. Thus, a conveyor system may be provided and operatively connected to receiving surface supports 53a and 53b (FIG. 1A) which move relative to build table 52. In one example, rotating shafts 65a-65c are provided to allow for relative movement between receiving surface supports 53a and 53b and an actuation mechanism is provided to drive the receiving surface 54 and its supports 53a and 53b along the rotating shaft 65a-65c.

Print engine 43 is preferably operated so that prior to printing the binder, a consistent thickness of powder 48 is provided relative to the last solidified layer. In the example of FIGS. 1A and 1B, powder 48 is not dispensed in a patterned fashion or a metered fashion in predetermined volumes, but merely exits the powder dispenser 44 based on the amount of powder, and the dispenser geometry. Thus, the traversal of smoothing blade 76 creates the final desired loose powder thickness before binder printing occurs. However, in the course of depositing powder 48 and smoothing it, loose powder is deposited into the object build area which will not be used to form the three-dimensional object. Preferably some mechanism is provided to contain at least some of the loose powder 48 so that it does not spread onto the build table 52 or past the edges of the receiving surface onto the floor. In the example of FIG. 1A, a retaining barrier 56 is provided which is dynamically erected during an object building operation. Retaining barrier 56 may also be dynamically disassembled following the completion of an object building operation. The object build area (not separately shown) lies within the retaining barrier 56.

In the example of FIG. 1A, a retaining barrier component positioner 50 is provided which is capable of positioning retaining barrier components (bricks 60) to form a retaining barrier 56. The retaining barrier component positioner of FIG. 1A is a gripper 50 comprising a pair of selectively openable and closable gripper arms. Gripper 50 is located at a distal end of print engine 43. A brick supply 58 comprising a collection of loose bricks is provided. An initial number of layers of the three-dimensional object are formed before any bricks 60 are placed on the receiving surface 54 around the object build area (i.e., the x-y area where the desired three-dimensional object may be built). Once the print plane, i.e. the build (z) axis height of the partially-formed three-dimensional object is higher than the vertical size of the individual bricks by more than a solidified object layer thickness ($\Delta z$), the first layer of bricks is set into place on receiving surface 54 using gripper 50. At this point, the solidified, exposed surface of the most recently formed object layer (the print plane 55 (FIG. 1C)) is preferably spaced apart by the top surface 63 of the bricks by at least one solidified object layer thickness ($\Delta z$). Then a number of additional layers of the three-dimensional object are formed until the current build (z) axis height of the exposed surface of the most recently formed object layer exceeds two times the vertical size of the individual bricks by at least the object layer thickness $\Delta z$. In general, in the formation of each layer, it is desirable to provide a layer of powder that is spaced above the top of the current retaining wall height and which has a thickness $\Delta z$ less than the depth of solidification that occurs when the binder is printed by print head 80.

Figure 1C:
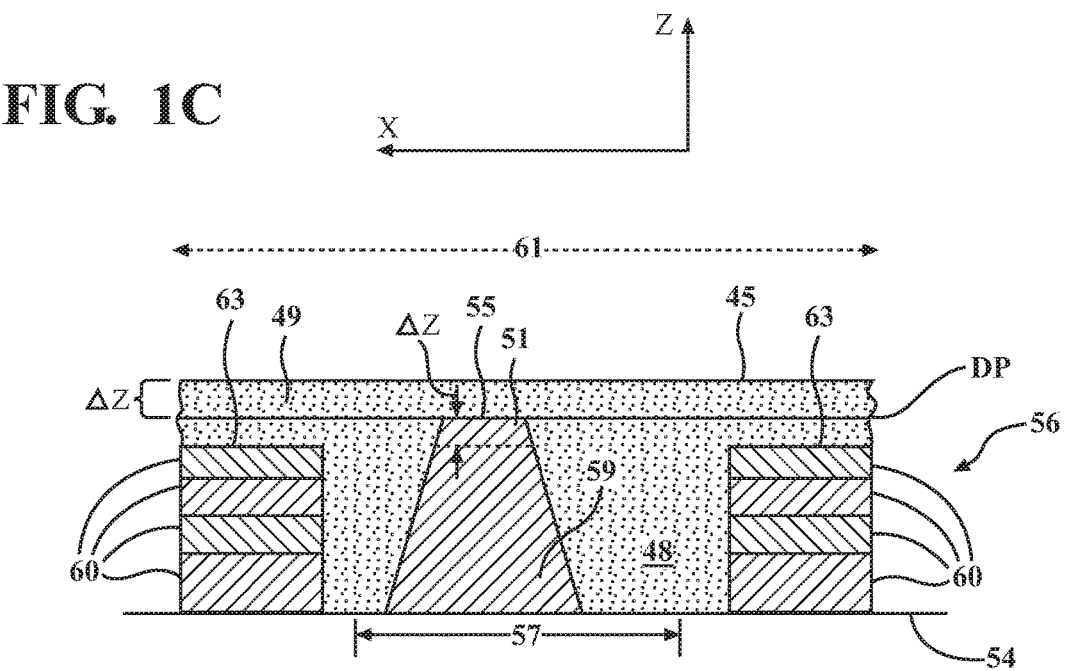
FIG. 1C is a cross-sectional view of a build volume, object build area, powder receiving area, retaining barrier, and three-dimensional object during an object building operation.

Referring to FIG. 1C, retaining barrier 56 preferably defines a receiving area 61 that is an area at the current dispensing plane 55 of the printer where powder 48 is dispensed by dispenser 44 and which is greater than the area of the object build area 57, which is the area on the receiving surface where powder solidification may occur to form a three-dimensional object and any auxiliary barriers.

The retaining barrier 56 is preferably positioned adjacent to the object build area 57 (and more preferably spaced apart from it by some specified margin) so as not to occupy space where the three-dimensional object 59 will be built. However, retaining barrier 56 need not fully encircle the object build area and instead may act as a barrier that impedes the movement of powder 48 in one or more directions in the object build area.

A method of forming a layer of a three-dimensional object having a solidified object layer thickness $\Delta z$ using the apparatus of FIGS. 1A and 1B will now be described with reference to FIG. 1C. In accordance with the method, an immediately previous layer 51 of the three-dimensional object 59 has just been built and is fully or partially encircled by a retaining barrier 56 which has a current height (for example four (4) bricks high as shown in the figure).

Next layer 49 of powder 48 is dispensed with powder dispenser 44 onto dispensing plane DP (55) and occupies a space above the print plane (not shown in the figure). The robot 42 is then positioned so that the bottom of smoothing blade 76 (FIG. 1B) is at a position where the exposed surface 45 of the powder will be spaced apart from the upper surface 55 (the dispensing plane) of the most recently formed object layer 51 by no more than an object layer thickness $\Delta z$. Print engine 43 is traversed over receiving area 61. If the powder dispenser 44 is leading the smoothing blade 76, powder may be dispensed simultaneously with the motion and the blade will smooth and level the powder 48 as the powder 48 is dispensed. If the smoothing blade 76 is leading the powder dispenser 44, smoothing will not occur until the return traverse in the opposite direction. However, once smoothing is complete, the exposed surface 45 of loose powder is preferably substantially planar and defines a print plane for the current layer, and the build surface will have advanced upwards by the object layer thickness $\Delta z$ coinciding with the exposed surface 45.

The deposited powder is then bound in a pattern corresponding to the cross-sectional profile of the three-dimensional object on the build surface at the current object build (z) axis height. In one case, binding is performed by traversing printhead 80 over receiving surface 54 within object build area 57 and printing binder liquid from print head 80 onto the exposed surface 45 (print plane) of powder 48 in a pattern corresponding to the cross-section of the three-dimensional object at the current object height. The binder liquid solidifies the powder layer 49 to a depth $\Delta z$ that is the solidified object layer thickness. In certain cases a chemical activator is also printed or provided in the powder to activate the binder and cause binding to occur. It is important to ensure that the depth of solidification along the build (z) axis is not less than the thickness of the powder layer 49 or else the current object layer will not bind to the previous object layer 51, and the object build process will fail.

The binder liquid may be dispensed on each traverse of print engine 43 over object build area 57 or only when the print engine 43 traverses a particular direction (e.g. counterclockwise from above viewed along the build (z) axis). In either case, binder printing preferably only occurs when a substantially smooth planar, exposed surface 45 of powder 48 is provided which is spaced apart from the top 63 of the retaining barrier 56 by at least the object layer thickness $\Delta z$. Exposed surface 45 defines the print plane for the current layer.

In other embodiments, more specialized mechanical components may be assembled to form a wall or fence that occupies less space than a set of rectangular bricks, and may be more specialized to the operation of the machine. For example, one may use sheets or cards with interlocking tabs that key into slots in the receiving surface and allow a continuous fence to be built up by sliding cards together on their edges so that the tabs support the individual parts. Referring to FIG. 2, another example of an apparatus 40 for making a three-dimensional object by selectively binding a powder is depicted. Like numerals refer to like components and operate as described previously. In this example, the retaining barrier 56 components comprise barbed structural members 84 that are horizontally interlockable and vertically stackable. The barbed structural members 84 may be connected and formed into a long flexible structure that may be dispensed like one long chain wrapped into layers or they may be individual members that are dispensed onto the previous layer and interlock in situ. A dispenser 86 is provided on the distal end of the print engine 43 for dispensing the barbed structural members 84 to partially or wholly encircle the object build area. The dispenser 86 may comprise, for example, a rotating helix or auger. Geometric designs other than those depicted in FIG. 2 may also be used. If there are gaps between the barbed members 84 and/or within individual barbed members 84, they may be filled with a solidifiable or cohesive material to prevent loose powder leakage.

As with the example of FIG. 1C, each layer 49 of deposited powder (after smoothing) preferably has a thickness along the build (z) axis that is no less than the object layer thickness $\Delta z$ (or more appropriately, the depth to which the powder 48 would solidify). Initially, a number of object layers is solidified until the height of the print plane is positioned above the upper surface 87 of the barbed members 84. Print engine 43 then traverses the object build area 57 (FIG. 1C) to deposit and smooth powder 48 to create a layer of powder 49 that is no thicker than the object layer thickness $\Delta z$. The powder layer 49 (FIG. 1C) is then bound in a pattern corresponding to the cross-section of the three-dimensional object at the current object height using any of the binding techniques described previously. The process is repeated until the object is complete.

Figure 3:
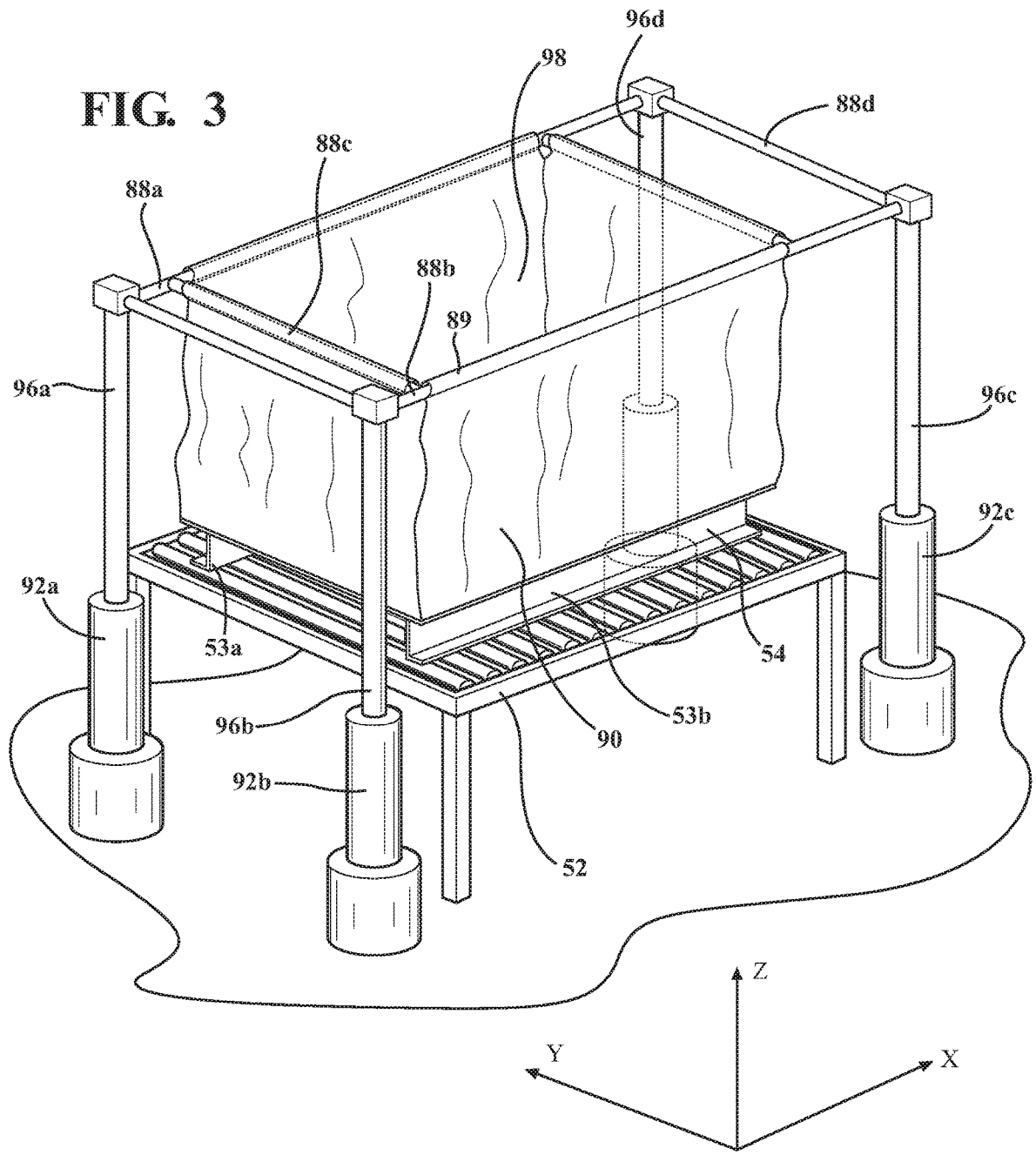
FIG. 3 is a perspective view of an apparatus for making a three-dimensional object by dynamically expanding a flexible fabric retaining barrier during an object building process.

In certain examples, a retaining barrier is not constructed dynamically but is expanded from a configuration in which it is retracted along the build (z) axis to one in which it is expanded along the build (z) axis. In one scenario, the expandable and retractable barrier may be made from several interlocking parts placed or clamped on the receiving surface in its retracted form and expanded in a series of steps during the process of building a part. This may take the form of a flexible bag or fence that folds flat and is supported by a frame around its top edge. A portion of the bag may contact the receiving surface and may occupy at least a portion of the object build area to provide the best possible containment of powder. At the commencement of a build, a quantity of loose powder must be spread over the surface of the bag to form a level build surface that defines a print plane and whose height exceeds the height of the folded portion of the bag on the receiving surface as well as the height of the frame when the bag is in its fully collapsed configuration. The flexible fabric may further include rigid reinforcing plates or internal ribs that prevent bulging of the enclosure. The flexible fabric may further include a second frame that is clamped at the circumference of the receiving surface in order to stabilize its lower edge. The fabric may also include pleats or tie-offs to adjust the circumference of the fence. Referring to FIG. 3, a portion of an apparatus for making a three-dimensional object is depicted. In the depicted apparatus, the robot and print engine are not shown. However, during normal operation they would be present and operated as previously described.

In FIG. 3, retaining barrier 90 is a flexible bag that is selectively retractable and expandable along the build (z) axis during an object build operation. The flexible bag 90 has a bottom 98 that is substantially co-extensive with the object build area portion 57 (FIG. 1C) of receiving surface 54. Four vertical actuators 92a-92d with corresponding shafts 96a-96d which are extendable and retractable along the build (z) axis are provided. Four horizontal members 88a-88d are provided and are connected to an upper portion of the flexible bag 90. In the depicted example, the horizontal members 88a-88d are each threaded through loops 89 (only one is identified with a reference numeral) in the flexible bag 90. The actuators 92a-92d may be electrically or hydraulically actuated. As the shafts 96a-96d extend along the build (z) axis, the flexible bag 90 expands along the build (z) axis and the height of the flexible bag 90 changes. The actuators 92a-92d may be operated so that the vertical increments in which the flexible bag 90 is expanded are smaller than with discrete retaining barrier components such as bricks. The vertical increments may also be adjusted. However, the layer of powder 48 to be solidified to form an object layer is preferably no thicker than the solidified object layer thickness Δz, and the upper most surface 55 of the object 59 is preferably positioned above the upper surface 91 of the horizontal members 88a-88d. The flexible bag 90 is preferably expanded by a selected vertical increment once the uppermost surface of the most recently formed object layer is spaced apart from the horizontal members 88a-88d by more than the flexible bag's 90 vertical expansion increment so that at all times the uppermost surface 55 (the dispensing plane) of the most recently formed object layer 51 is above (along the build (z) axis) the horizontal members 88a-88d. Once the powder 48 is dispensed and smoothed, the binder is printed in a pattern corresponding to the cross-section of the object at the current object height. The process then repeats for subsequent layers. Once completed, the object may be removed from the bed of loose powder 48 (not shown) contained in the interior of flexible bag 90, and the powder 48 may be collected for re-use.

Figure 4:
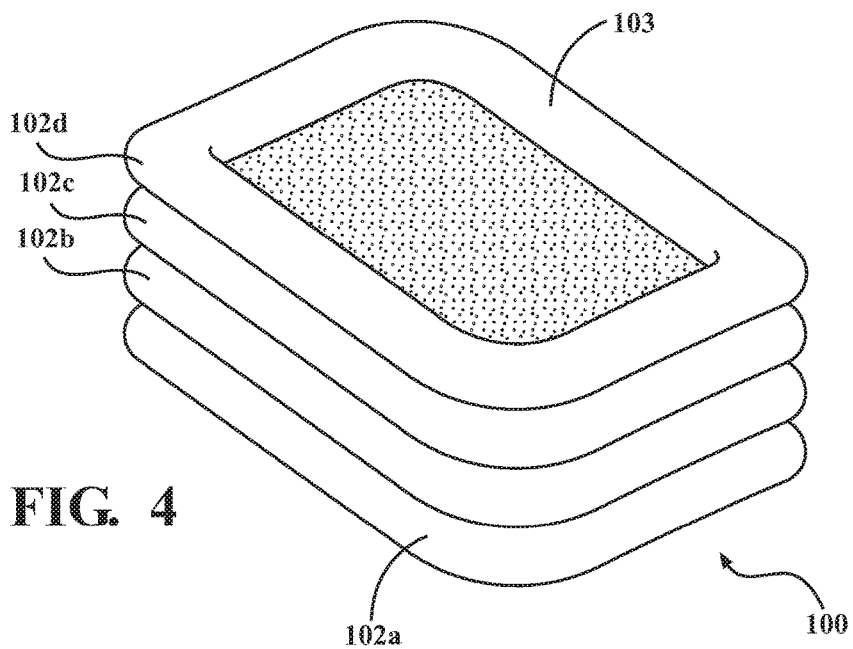
FIG. 4 is a perspective view of an apparatus for making a three-dimensional object by inflating a series of inflatable toroids to dynamically expand a retaining barrier during an object building process.

Alternatively, a flexible fence 90 may comprise an inflatable wall with one or several toroidal chambers that may be collapsed flat and lofted by pumping a gas or liquid into the hollow space inside the chambers, either as a whole or in sequence. Referring to FIG. 4, the retaining barrier comprises a set of inflatable toroids 100. Only four (4) toroids 102a-102d are shown. However, many more would be present. Each toroid is separately inflatable from the other toroids and has generally rectangular shape with an open central area that aligns with the object build area 57 of the receiving surface 54. The set of toroids 100 sits on the receiving surface 54. A new toroid 102a-102d is preferably inflated once the uppermost surface 55 of the solidified object 59 is spaced apart from the upper surface 103 of set of inflatable toroids 100 along the build (z) axis by more than the height of next toroid to be inflated to ensure that the uppermost surface 55 (FIG. 1C) of solidified object 59 is always above the uppermost surface 103 of the set of inflatable toroids 100. The print engine 43 then traverses the receiving area 61 (FIG. 1C) on the dispensing plane 55 to deposit a layer of powder 49 that is preferably no greater in thickness than the object layer thickness Δz. Smoothing blade 76 provides a substantially smooth and planar, exposed powder surface 45 that defines a print plane. Binder print head 80 traverses the object build area 57 and prints binder liquid in a pattern corresponding to the cross-sectional profile of the three-dimensional object on the build surface at the current build (z) axis position. The toroids may be inflated from top down (i.e., starting with 102d in FIG. 4) or vice-versa (i.e., starting with 102a) to progressively expand the vertical height of the set of toroids 100 along the build (z) axis.

Figure 5:
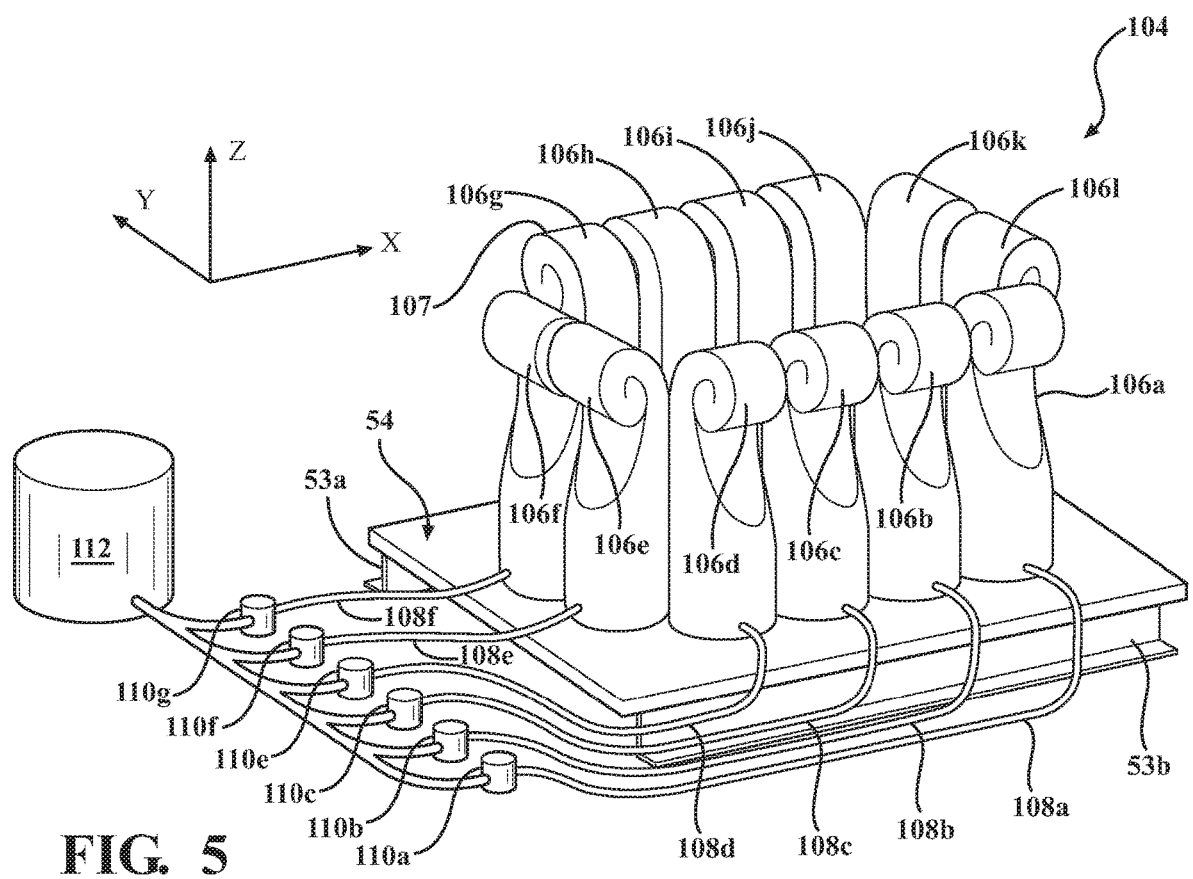
FIG. 5 is a perspective view of an apparatus for making a three-dimensional object wherein a plurality of expandable pressure chambers dynamically expand a retaining barrier during an object building process.

A vertically expandable and retractable retaining barrier fence may also be formed from coiled pressure chambers. Referring to FIG. 5, a retaining barrier 104 comprising coiled pressure chambers 106a-106l is provided. The coiled pressure chambers 106a-106l may be joined together to prevent leakage of powder 48 from between the chambers. Each coiled pressure chamber 106a-106l is in selective fluid communication with a source of hydraulic or pneumatic fluid 112 via its own corresponding supply line 108a-108l (only 108a-108f are visible). Each coiled pressure chamber 106a-106l also has its own corresponding control valve 110a-110l (only 110a to 110g are shown) to selectively admit hydraulic or pneumatic fluid into the pressure chamber 106a-106l to expand the vertical (build (z) axis) height of the retaining barrier 104. The pressure chambers may be mounted to the build table 52 such that when they are fully retracted their upper edge is below the plane of the receiving surface 54 in the space provided by the receiving surface supports 53a and 53b (referring to FIG. 1a.) A mechanism is also provided to lower the pressure at the hydraulic or pneumatic supply so that the control valves 110a-110l can be used to deflate the coiled corresponding pressure chambers 106a-106l to a fully-retracted configuration following the completion of an object building operation. The control valves 110a-110l may be operated so that the vertical increments in which the coiled pressure chambers 106a-106l are expanded are smaller than with objects such as bricks. The vertical increments may also be adjusted. However, the vertical expansion increments are preferably greater than the object layer thickness Δz. The layer of powder 49 to be solidified to form an object layer is preferably no thicker than the object layer thickness Δz, and the upper most surface 55 of the object 59 is preferably positioned above the upper edge of the coiled pressure chambers 106a-106l along the build (z) axis. The coiled pressure chambers 106a-106l are preferably expanded by a selected vertical increment once the uppermost surface 55 (the dispensing plane) of the most recently formed object layer 51 is spaced apart from the top surface 107 of the coiled pressure chambers 106a-106l by more than the chambers' vertical expansion increment so that at all times the uppermost surface 55 (the dispensing plane) of the most recently formed object layer 51 is above (along the build (z) axis) the top surface 107 of the pressure chambers 106a-106l. Once the powder 48 is dispensed onto the dispensing area 61 (the vertical (z-axis) projection of the dispensing surface 54 onto the dispensing plane 55) and smoothed, the binder is printed in a pattern corresponding to the cross-section of the object at the current object height. The process then repeats for subsequent layers.

Figure 6A:
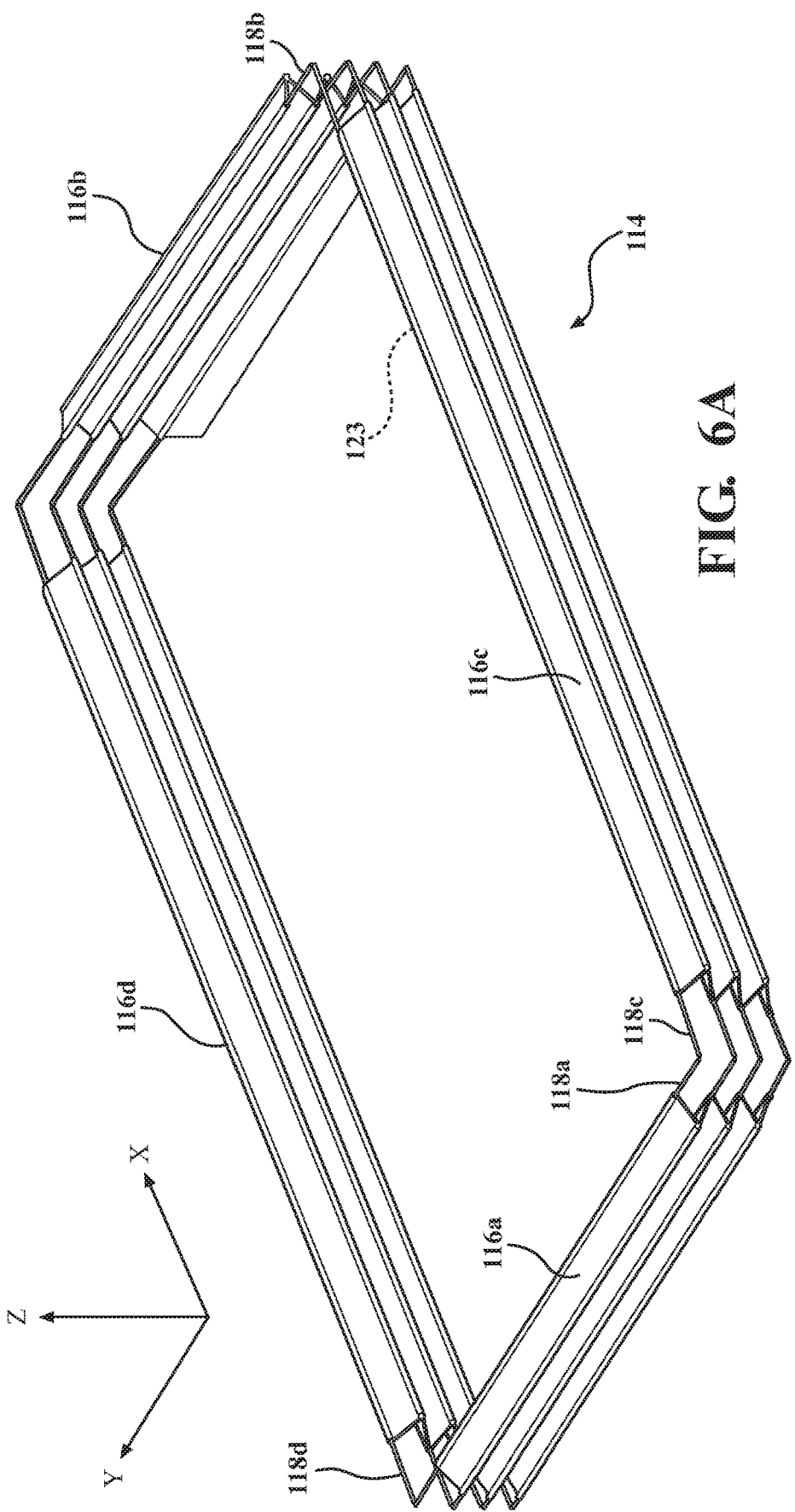
FIG. 6A is a perspective view of a dynamically expandable retaining barrier comprising a plurality of hinged panels.
Figure 6B:
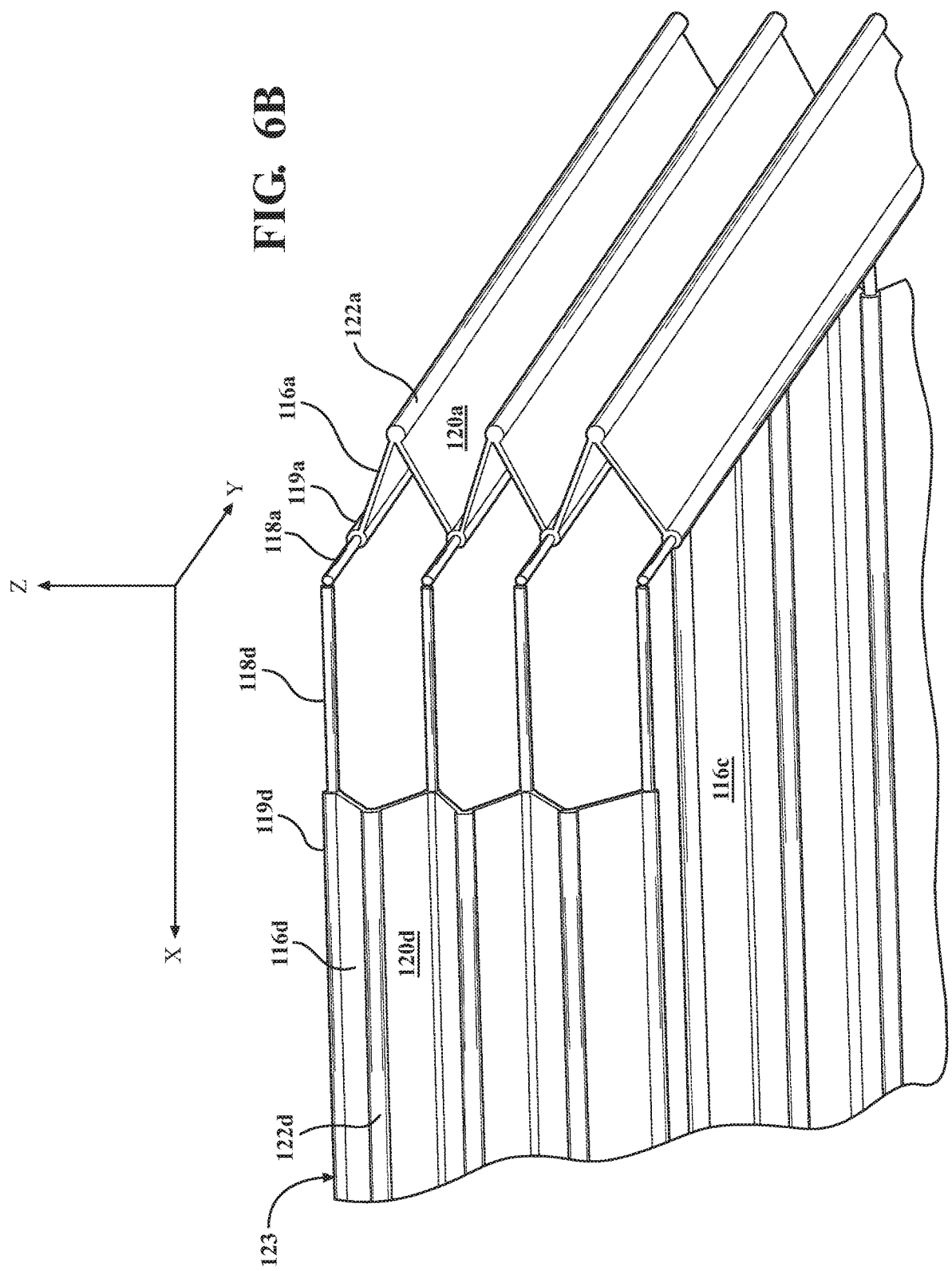
FIG. 6B is a close-up perspective view of a portion of the retaining barrier of FIG. 6A.

In another example, the expandable and retractable retaining barrier may comprise a pleated structure that may be formed from a flexible material, such as flexible plastic, thin sheet metal, rubber or fabric; or may be formed from a rigid material, such as hard plastic or thick sheet metal, with hinges at the corners to allow the barrier to unfold and retract. Referring to FIG. 6A, a retaining barrier 114 comprised of a plurality of hinged rigid panels is depicted. Only panels 116*a*-116*d* are shown in FIG. 6A. Each panel is supported on a corresponding hinge pin (only hinge pins 118*a*-118*d* are identified with reference numerals). As shown in FIG. 6B, one side along the length of panel 116*a* is hingedly connected to hinge pin 118*a* which is inserted through elongated opening 119*a*. The other side of the length of panel 116*a* is connected to vertically adjacent panel 120*a* via connecting hinge 122*a*. Panel 116*d* is connected to hinge pin 118*d* via elongated opening 119*d* in the same way and is hingedly connected to adjacent panel 120*d* via connecting hinge 122*d*. Although not shown in the figures, a gripping device or devices may be used to pull the upper hinge pins 118*a*-118*d* in the vertically (build (z) axis) upward direction to progressively expand the retaining barrier 114 and upper surface 123 from a fully vertically collapsed configuration to a fully vertically expanded configuration. The vertical increments in which the height of the retaining barrier 114 is expanded may be adjusted but are preferably greater than the object layer thickness Δz. At the outset of an object build process, powder is preferably dispensed in receiving area 61 (FIG. 1C) until it has an exposed surface 45 that is spaced above the top of retaining barrier 114 when retaining barrier 114 is in its fully collapsed condition. The height of the retaining barrier 114 is preferably adjusted once the uppermost surface 55 (FIG. 1C) of the most recently formed object layer 51 is more than the height of the vertical expansion increment so that the dispensing plane 55 remains above the top of the retaining barrier 114. The print engine 43 preferably deposits powder 48 to define a powder layer 49 thickness that is no greater than the solidified object layer thickness Δz. The powder layer 49 is then bound in a pattern corresponding to the three-dimensional object as described previously.

Figure 7:
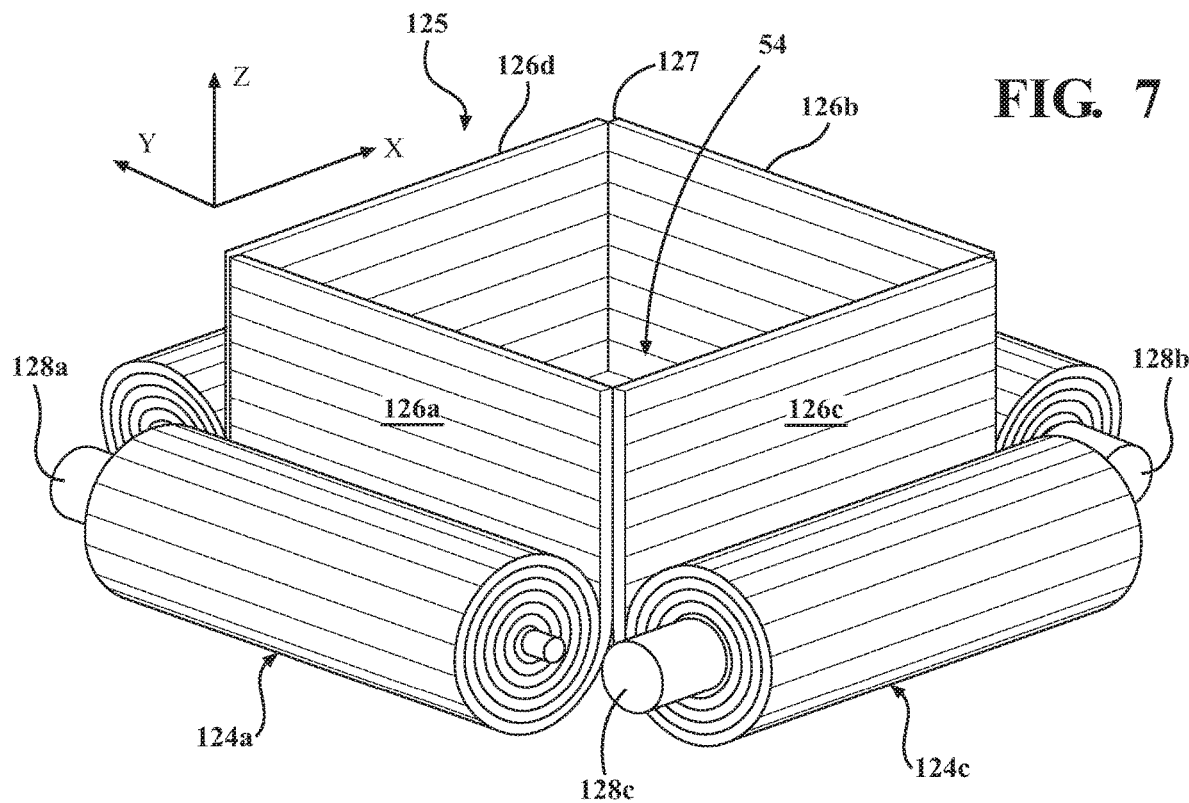
FIG. 7 is a perspective view of an apparatus for making a three-dimensional object wherein coiled, hinged sheets provide a dynamically expandable retaining barrier used during an object building process.

In other examples, the retaining barrier may be formed from a flexible sheet, a plurality of flexible strips, or a set of hinged panels that may be deployed from a set of rolls with horizontal axes of rotation that surround the receiving surface 54. The rolls may be motorized to loft the retaining barrier by unrolling the panels; or it may be passive, with the lofting motion provided by a lifting apparatus external to the machine. Referring to FIG. 7, hinged sheets 126*a*-126*d* are wound into coils 124*a*-124*d* (only 124*a* and 124*c* are shown) spooled on corresponding motor-driven shafts 128*a*-128*d* (only 128*a* and 128*c* are shown). Rotation of the motor-driven shafts 128*a*-128*d* about their longitudinal axes in one rotational direction causes the corresponding hinged sheets 126*a*-126*d* and upper surface 127 to extend vertically (build (z) axis) upward to expand the height of retaining barrier 125 toward a fully expanded configuration. Rotation of the motor-driven shafts 128*a*-128*d* in the opposite direction about their longitudinal axes causes the corresponding hinged sheets 126*a*-126*d* to retract vertically (build (z) axis) downward toward a fully retracted configuration. The hinged sheets 126*a*-126*d* may have connectors that connect uncoiled portions of adjacent sheets 126*a*-126*d* to one another and which disconnect when the portions of the adjacent sheets 126*a*-126*d* are coiled to reduce powder leakage from between adjacent hinged sheets 126*a*-126*d*. The height of the retaining barrier 125 is preferably increased in vertical increments in a fashion similar to that of FIGS. 3, 6A and 6B with the layers being configured as shown in FIG. 1C prior to binding the powder into a pattern corresponding to the object's cross-sectional profile at the current build (z) axis position.

Figure 8:
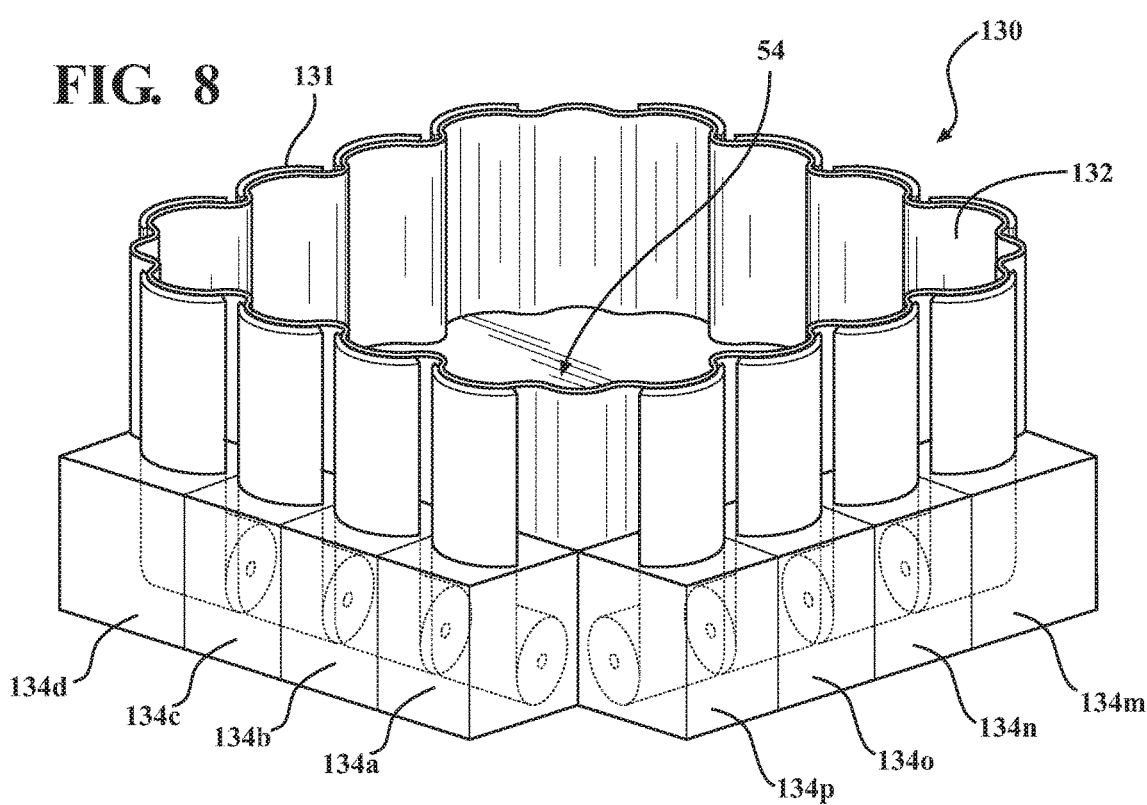
FIG. 8 is perspective view of an apparatus for making a three-dimensional object comprising a retaining barrier with stiff elastic sections wound on coils.

Referring to FIG. 8, an expandable and retractable retaining barrier 130 is formed by coils of elastic ribbon (or constant-force springs) that become rigid when they are uncoiled. A plurality of coils 134*a*-134*p* may occupy a space beneath the receiving surface 54 and a retaining barrier may be erected by progressively rotating the set of coils such that the ribbons in their rigid configuration are projected parallel to the build (z) axis. The action may be active or passive as described previously for FIG. 7. To retain powder along mating edges of the elastic ribbons, a set of fabric strips may be provided that cover the gaps between adjacent ribbons. The height of the retaining barrier 125 is preferably increased in vertical increments in a fashion similar to that of FIGS. 3, 6A and 6B with the layers being configured as shown in FIG. 1C prior to binding the powder into a pattern corresponding to the object's cross-sectional profile at the current build (z) axis position. In the example of FIG. 8, as well as those of FIGS. 3, 5, 6, 7, 13, 14, and 15, the vertical increment of motion of the expandable and retractable retaining barrier 130 may be quite small and may even approach the layer thickness Δz. However, the accuracy of the vertical motion is typically less than that of robot 42. In such cases, the spacing between the upper surface 131 of the retaining barrier 130 and the print plane is preferably greater than the level of accuracy of the retaining barrier's vertical increment of motion.

Figure 9:
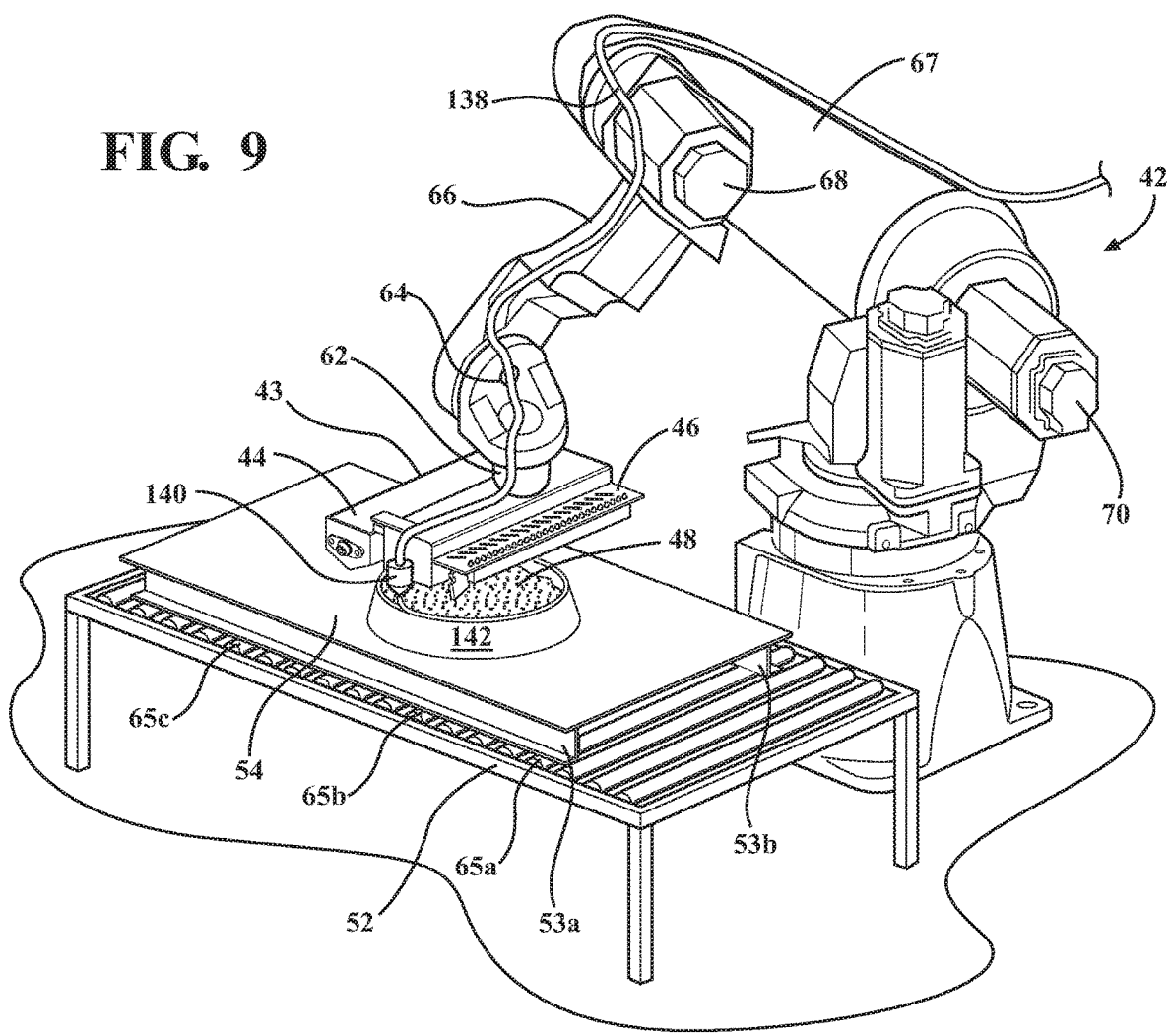
FIG. 9 is perspective view of an apparatus for making a three-dimensional object in which a second binder and second liquid dispenser are used to form a retaining barrier from the powder used to form the three-dimensional object.

In another example, the wall that surrounds the build volume may be fabricated from a material dispensed by the printing engine 43 on the robot 42 that forms a rigid barrier in its own right, yet not formed exclusively from the combination of materials (powder, binder, activator, etc.) used by the 3D printer to build the parts. An example of this is a cementitious slurry that may be deposited by a mixer/extruder in a path that follows the circumference of the active object build area. Referring to FIG. 9, a secondary dispenser 140 dispenses a cementitious slurry around the receiving area 61 (FIG. 1C) to form retaining wall 142. The secondary dispenser 140 is disposed at a distal end of build engine 43 and is manipulated by a combination of x-y motion of the printing engine and rotation of the printing engine about the vertical (z) axis. The robot 42 is manipulated so that the secondary dispenser 140 traverses a path around the object build area that defines retaining wall 142. Supply line 138 connects secondary dispenser 140 to a source of the retaining wall 142 material. The robot 42 may be operated to dispense the slurry at an adjustable vertical increments, which are preferably greater than the object layer thickness Δz. The height of the retaining barrier 142 is preferably increased in vertical increments in a fashion similar to that of FIGS. 3, 6A and 6B with the layers being configured as shown in FIG. 1C prior to binding the powder into a pattern corresponding to the object's cross-sectional profile at the current build (z) axis position.

Figure 10A:
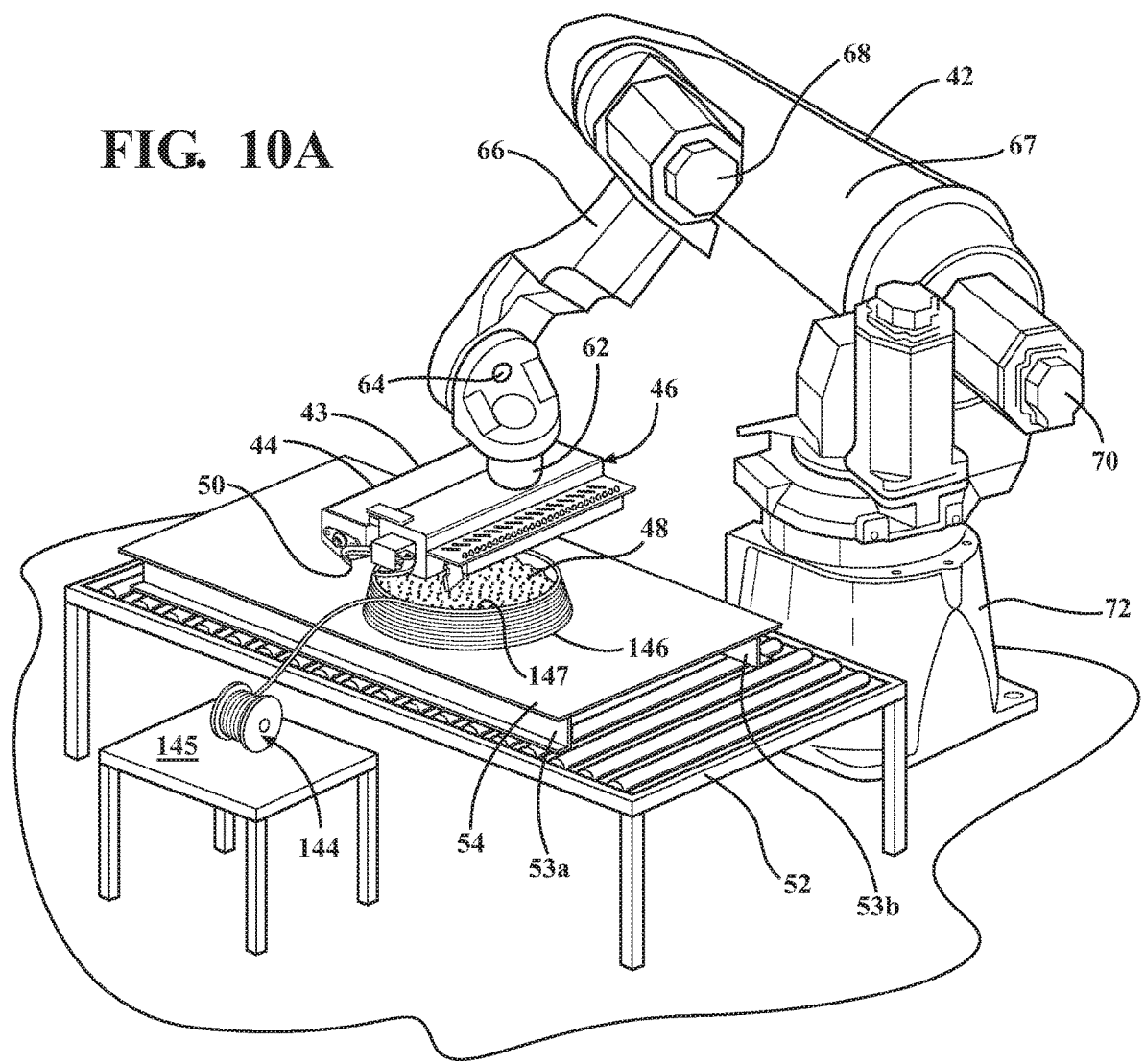
FIG. 10A is a perspective view of an apparatus for making a three-dimensional object wherein a barbed rope is used to dynamically build a retaining barrier during an object building process with the apparatus in a first operative configuration.
Figure 10B:
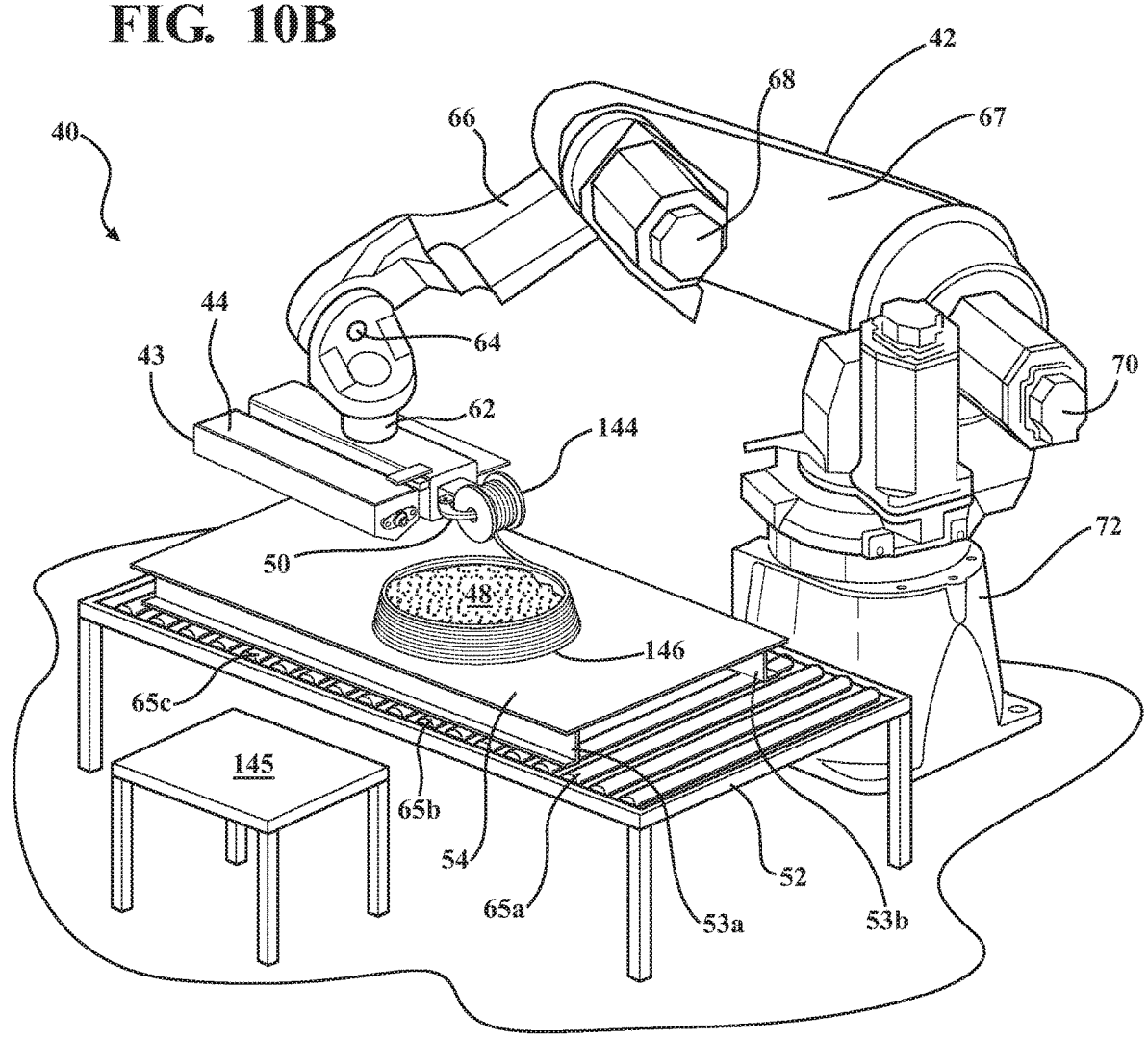
FIG. 10B is a perspective view of the apparatus of FIG. 10A in a second operative configuration.

In another example, a rope of flexible material that may possess interlocking barbs or may be impregnated with an adhesive is used to form a retaining barrier. Such a rope may be dispensed from a reel carried by the robot to wrap around the perimeter of the receiving surface in order to construct a fence gradually during the build. Referring to FIGS. 10A and 10B, a spool of barbed rope 144 is provided and used to form retaining barrier 146. In FIG. 10A a gripper 50 is located on the distal end of the print engine 43. However, gripper 50 could also be positioned in other positions that are operatively connected to first articulating arm 66 and movable therewith. A separate arm could also be provided for gripper 50.

When adding a layer to retaining barrier 56, the gripper 50 grips spool 144 and traverses the perimeter of the object build area to unspool a segment of the barbed rope onto the previously deposited barbed rope such that the barbs interlock and hold the layers of rope together. Once the new layer of rope has been deposited, print engine 43 moves the gripper 50 away from the object build area and deposits the spool 144 onto a stand 145 so that the print engine 43 can deposit powder 48 and print the binder liquid in a pattern corresponding to the cross-sectional profile of the three-dimensional object at the current build (z) axis height.

The vertical increments in which the retaining barrier 146 is progressively built are defined by the rope thickness. Once the current upper surface 55 (the dispensing plane in FIG. 1C) of the most recently formed object layer 51 is spaced apart from the upper surface 147 of the retaining barrier 146 by more than the rope thickness, another layer of rope is added to retaining barrier 146. Powder 48 is then dispensed by traversing print engine 43 over the receiving area 61 (FIG. 1C), and smoothing blade 76 is used to ensure that the thickness of the deposited powder layer 49 is no greater than the solidified object layer thickness $\Delta z$. Binder liquid is printed onto the surface of the powder in object build area 57 in a pattern corresponding to the cross-sectional profile of the three-dimensional object being built at the current build (z) axis location. The process is repeated until the object is complete, at which point it may be removed from the object build area, and any loose powder may be recovered. The barbed rope may then be respooled on spool 144, either automatically or manually.

Figure 11:
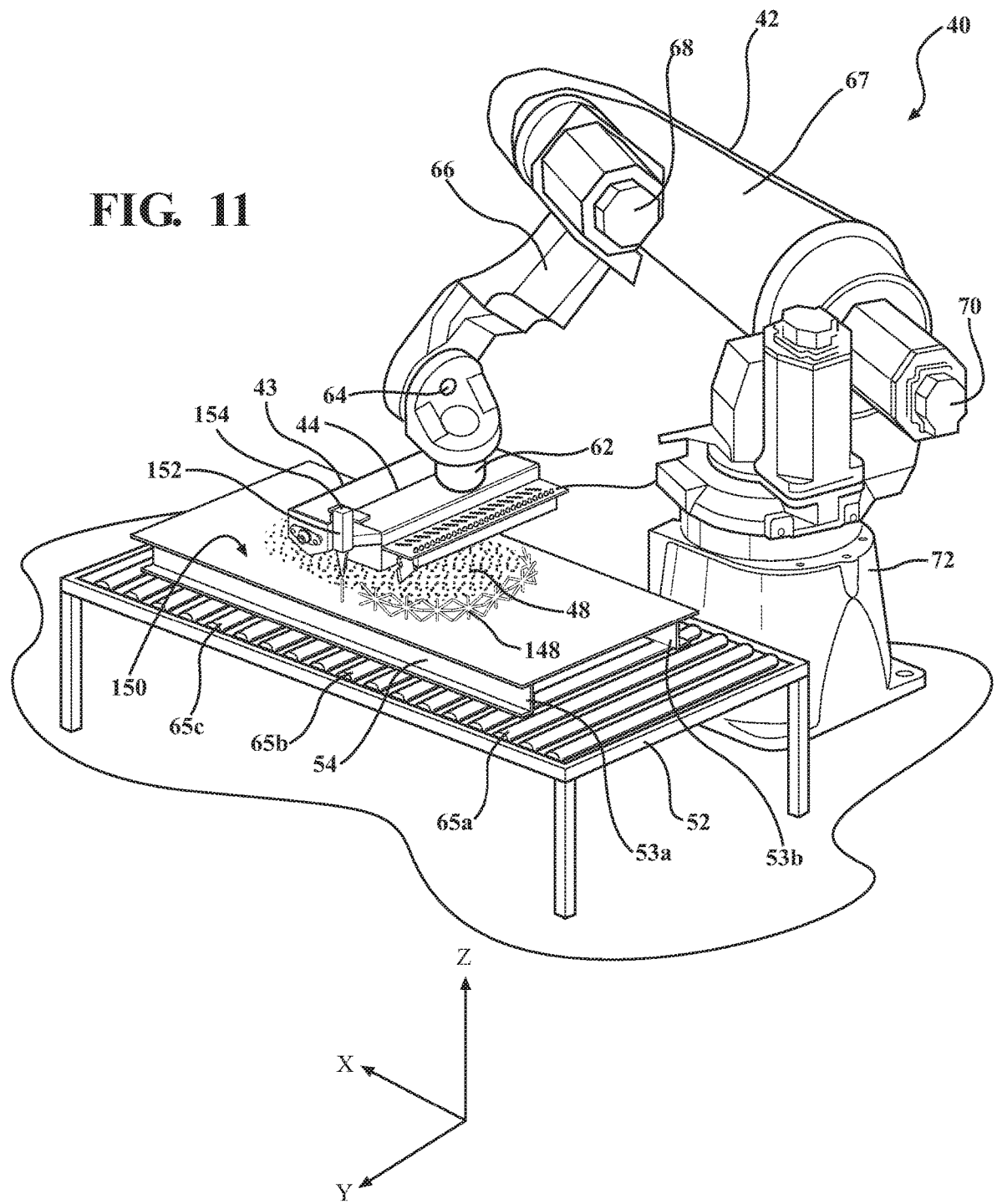
FIG. 11 is a perspective view of an apparatus for making a three-dimensional object comprising a plurality of pins and a porous substrate used to dynamically build a retaining barrier during an object building process.

In another example, a retaining barrier is formed from a collection of short wires or spears pressed vertically or diagonally into a porous substrate on the receiving surface 54. The wires or spears may be joined by infiltrating with material dispensed either from the printing engine 43 or an alternative dispenser. Referring to FIG. 11, retaining barrier 148 is formed from a plurality of pins. The first layer of pins is inserted into a porous substrate 150 on receiving surface 54 of build table 52. Additional layers of pins may be inserted into previous layers of pins and/or by depositing a material onto the previous layer of pins such that the next layer of pins will adhere to it. The retaining barrier is progressively built up by interleaving pins placed later in the process with those placed earlier. Pins may be placed at various different angles from the vertical to facilitate weaving of each course into the previous one. A pin insertion tool 152 is provided on a distal end of print engine 43 proximate a pin supply 154. The pin heights will define vertical increments in which the retaining barrier 148 is built. Based on the vertical increments, the retaining wall is built during the object building operation in the manner described previously with respect to FIG. 1C.

In still another embodiment, a retaining barrier may be constructed by stacking a set of prefabricated frames that enclose the object build area. These frames may be placed manually or they may be assembled by an automated mechanism. They may possess interlocking features, such as pegs and slots that locate the frames and permit the loading from the powder to be supported.

Referring to FIG. 12, a stacked supply of frames 160 is provided. A frame conveyor (partially shown) is provided in which frame brackets 164a-168a and 164b-168b selectively attach to and convey frames to the object build area. In FIG. 12 receiving area 61 (FIG. 1C) has a frame stack 158 that defines the current retaining barrier 158. Prior to solidifying a new layer of a three-dimensional object, the dispensing plane (the uppermost surface of the most recently solidified object layer) (not shown in FIG. 12) is preferably above the top surface 170 of uppermost frame 162. Print engine 43 then traverses the receiving area 61 (FIG. 1C) to deposit powder 48 which is smoothed and leveled with smoothing blade 76 to create a powder thickness that is no greater than the solidified object layer thickness $\Delta z$. Binder printhead 80 traverses the object build area 57 (FIG. 1C) to deposit binder liquid on the exposed powder surface in a pattern corresponding to the cross-sectional profile of the three-dimensional object at the current object height. Once a number of layers have been solidified such that the uppermost object surface is spaced apart from top surface 170 of uppermost frame 162 by more than a frame thickness, a new frame 166 is conveyed to the object build area. The process repeats itself until the object is complete. The object and loose powder in the object build area 57 (FIG. 1C) may be removed and the frames returned to the stacked supply 160. During the solidification of each layer, the uppermost surface of the object (e.g., surface 55 of object 59 in FIG. 1C) is preferably above the top surface 170 of the uppermost frame 162 so that the binder printhead 80 may be maintained at a consistent distance from the exposed surface of the deposited powder 48 and so that the thickness of powder 48 is no more than the desired layer thickness and the depth to which the binder liquid penetrates the loose powder 48.

Figure 13A:
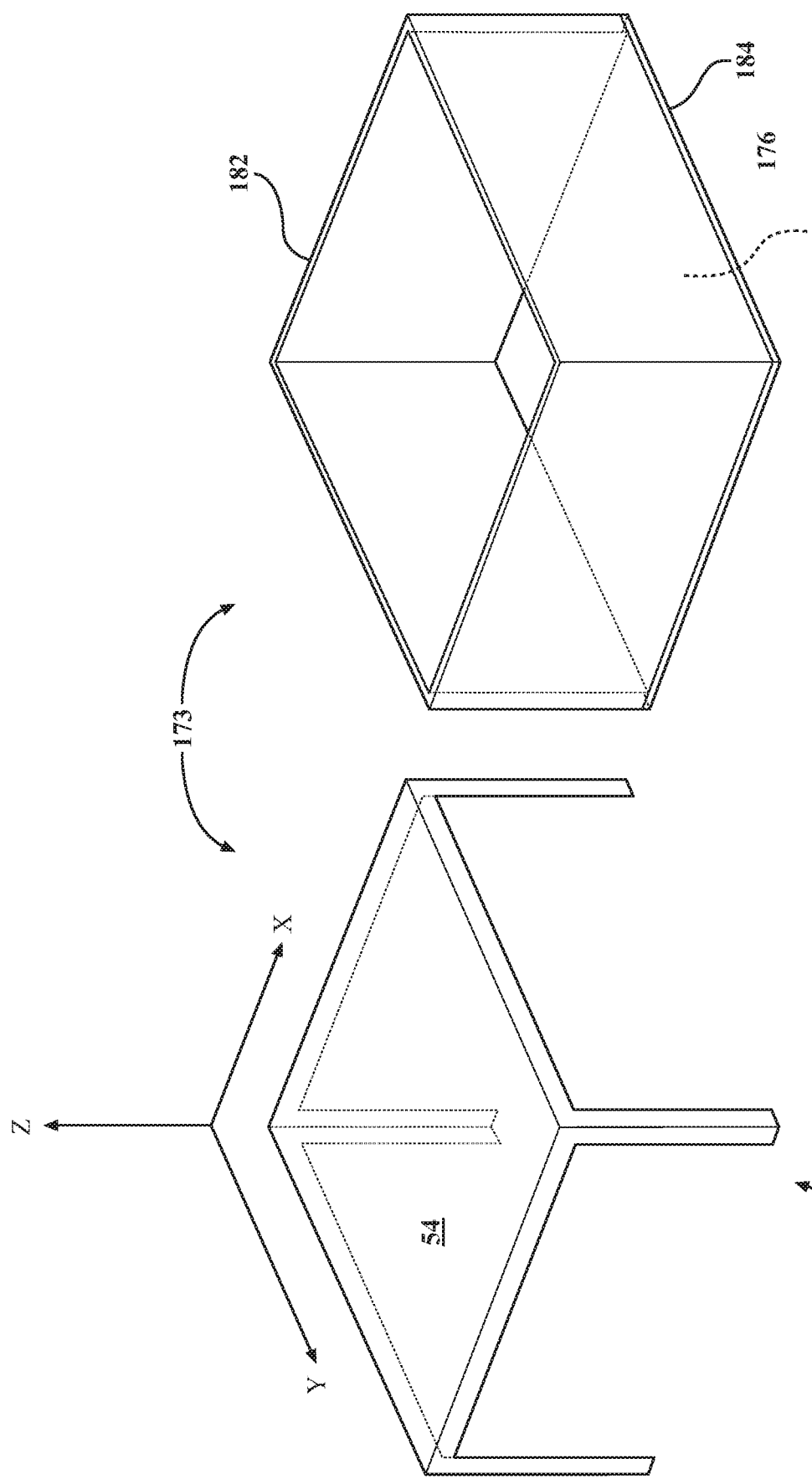
FIG. 13A is a perspective view of a table comprising a build surface and a rectangular sleeve used to provide a retaining barrier with a dynamically adjustable height suitable in certain object building processes described herein.
Figure 13B:
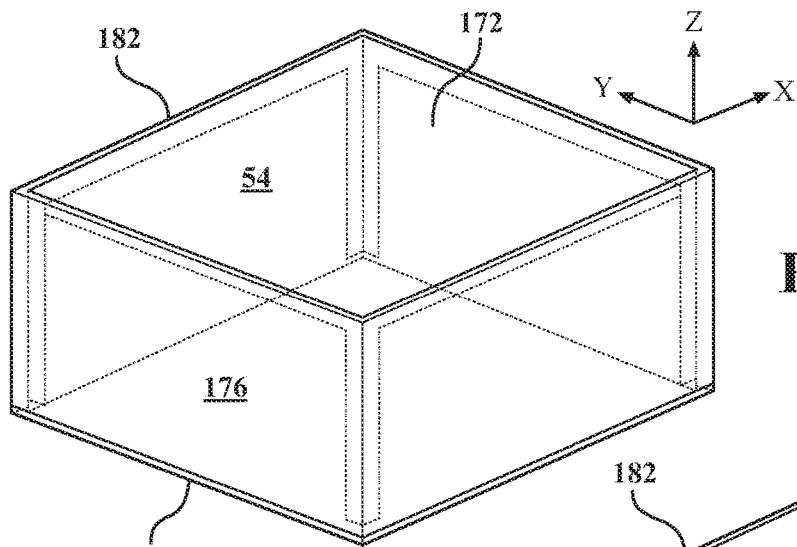
FIG. 13B is a perspective view of the table and sleeve of FIG. 13A in an assembled condition with the upper edge of the sleeve in a first position relative to the table's build surface.
Figure 13C:
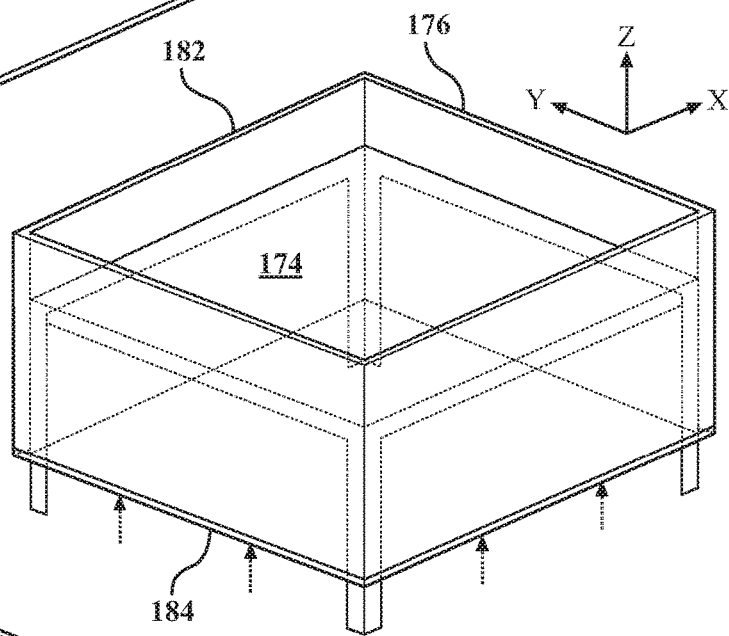
FIG. 13C is a perspective view of the table and sleeve of FIG. 13A in an assembled condition with the upper edge of the sleeve in a second position relative to the table's build surface.
Figure 13D:
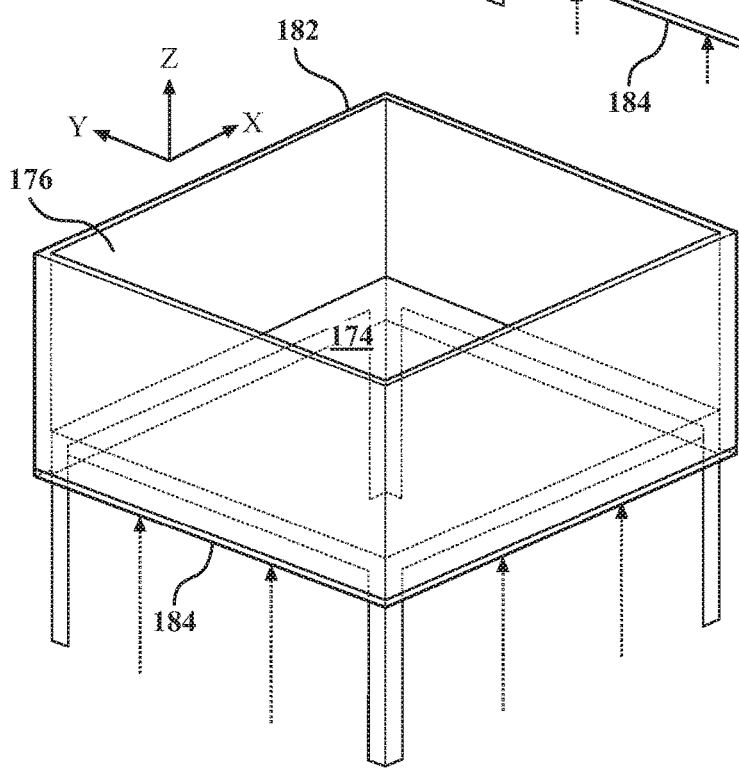
FIG. 13D is a perspective view of the table and sleeve of FIG. 13A in an assembled condition with the upper edge of the sleeve in a second position relative to the table's build surface.

In another embodiment, the retaining barrier or fence may be erected from a retractable barrier that is lofted by an external actuator during the printing process. A simple embodiment is to place a rigid sleeve the size of the receiving area around the receiving area. The sleeve surrounds the perimeter of the receiving surface 54 (FIG. 1C) and fits into a space below the plane of the receiving surface 54 as it is supported by the build table 172. It may be raised by a vertical actuator to a level just below the current height of the object during the build process, indexing upwards throughout the build process. Referring to FIGS. 13A-13D, a sleeved table assembly 173 is depicted. Sleeved table assembly 173 comprises a build table 172 and a substantially rigid sleeve 176 that fits over the build table 172, as shown in FIGS. 13B-13D. The circumference of the build table 172 may include a sliding seal that bridges the gap with sleeve 176 to prevent leakage of powder around the edge. In the figures, the build table 172 and substantially rigid sleeve 176 are rectangular. However, they may be circular or other shapes, as long as they are both designed so substantially rigid sleeve 176 fits over the build table 172 and is configured for indexed movement along the build (z) axis relative to the build table 172. An actuator or lifting mechanism (not shown) is also provided to move the sleeve 176 along the build (z) axis relative to build table 172.

In FIG. 13B sleeve 176 is in a fully retracted configuration relative to build table 172. In the fully retracted configuration, top edge 182 of sleeve 176 is at its lowest position along the build (z) axis. In the fully-retracted configuration, top edge 182 is preferably no higher along the build (z) axis than the receiving surface 54 supported by build table 172. Sleeve 176 is advanced upward along the build (z) axis in vertical increments which are preferably greater than the thickness of each object layer $\Delta z$. During an object build operation, a plurality of initial object layers is formed with the sleeve 176 at its fully retracted configuration. Once the height of the partially solidified object (e.g., object 59 in FIG. 1C) is higher than the vertical height increments used to advance the sleeve 176 along the build (z) axis, the sleeve 176 is advanced by that increment. Print engine 43 traverses the receiving area 61 and object build area 57 (FIG. 1C) to deposit powder 48, which is smoothed and leveled by smoothing blade 76 such that the powder layer thickness is no greater than the object layer thickness $\Delta z$. As printhead 80 traverses object build area 57, binder printhead 80 prints the binder in a pattern corresponding to the cross-sectional profile of the object being built at the current build (z) axis heights. Several more layers are built with the sleeve 176 at its current build (z) axis position, and then the process repeats itself. FIG. 13C shows the sleeve 176 partially advanced along the build (z) axis as would be the case at an intermediate point during the object build process. At the conclusion of the process, sleeve 176 reaches its fully extended position shown in FIG. 13D in which the sleeve top 182 and sleeve bottom 184 are at their highest build (z) axis positions (for shorter objects, the sleeve 176 may not reach its fully extended position before the object build is complete). The object 59 and any loose powder 48 may then be removed from the object build area 57 (see FIG. 1C). The vertical increments for indexing the movement of sleeve 176 may be set at any increment for which an actuator or lifting mechanism may be indexed. However, the vertical increments are preferably set to optimize the balance between the speed of the build process (which slows down as the vertical increments decrease) and the amount of powder spillage that occurs (which increases as the vertical increments increase).

In still another example, the retaining barrier may comprise a telescoping fence formed of a plurality of rigid sleeves that nest together. The sleeves may be formed from sheet metal, with a set of flanges that cause each course to capture the next course in the sequence. The entire assembly may be lofted by a linear actuator from below, or from a hoist from above provided the lines of support do not intersect the motion of the printing engine. Referring to FIGS. 14A-15E, an apparatus 186 for making a three-dimensional object is depicted which includes a telescoping retaining barrier 190. In FIG. 14A, the telescoping retaining barrier 190 is shown in a fully retracted configuration. Retaining barrier 190 is connected to and sits on an upper build plate 202 that has a plurality of openings 205. Upper build plate 202 sits on lower build plate 204. The upper build plate 202 and lower build plate 204 are configured to allow for the selective retention and disposal of bindable powder 48 (not shown in FIGS. 14A-15E). The build plates 202 and 204, and the retaining barrier 190 are movable along a conveyor 188 along a conveyor travel (x) axis. Conveyor 188 allows for multiple build plate/retaining barrier assemblies to move in an out of the area of robot 42 (not shown in FIGS. 14A-15E). Conveyor 188 includes rotating shafts 194 (one is identified with a reference numeral). Legs 195a-195f support conveyor 188. An actuator (not shown) is provided to move the build plate/retaining barrier assembly along the conveyor 188.

Figure 14B:
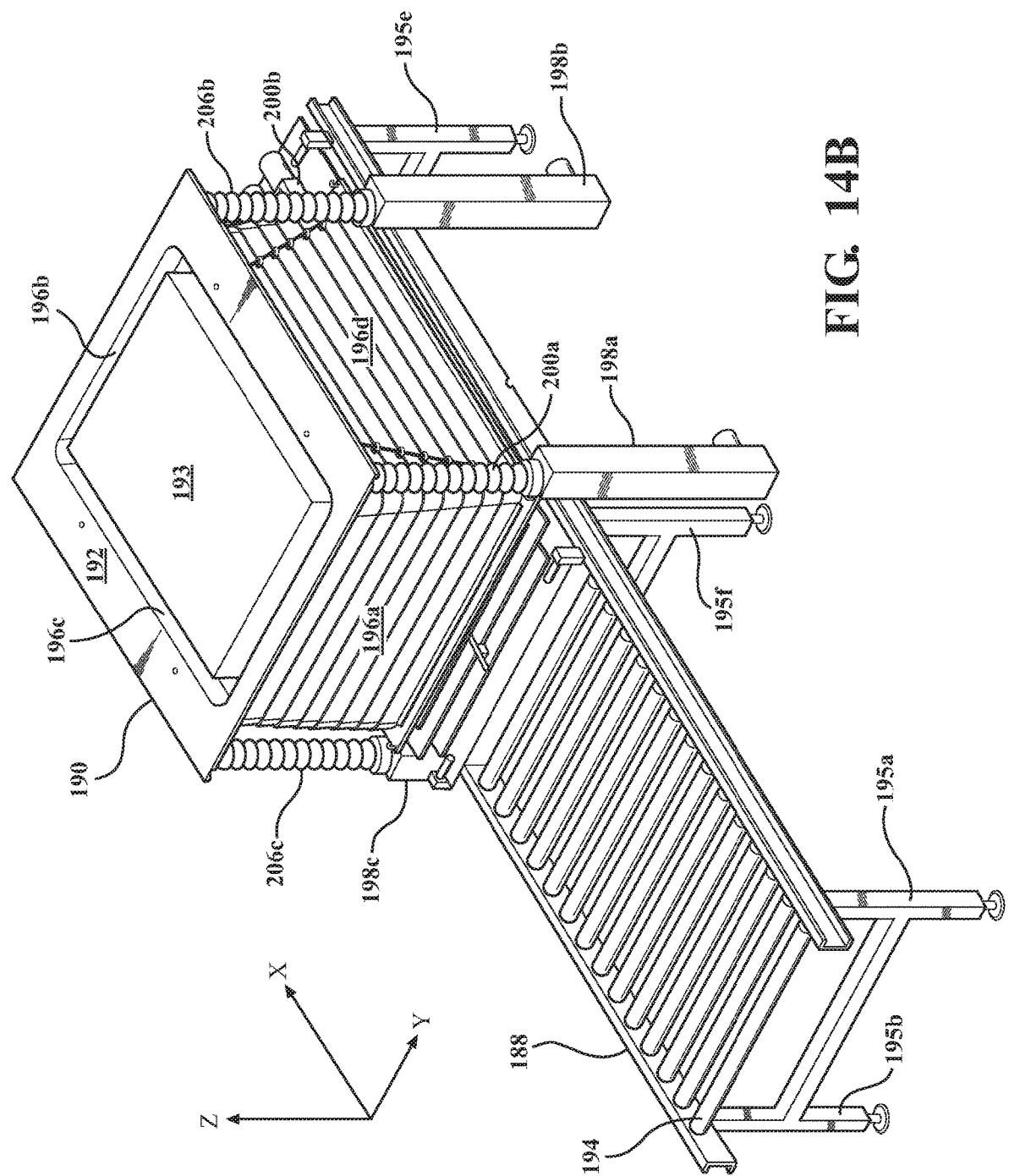
FIG. 14B is a perspective view of the apparatus of FIG. 14A with the retractable retaining barrier in a second, fully expanded configuration.
Figure 14C:
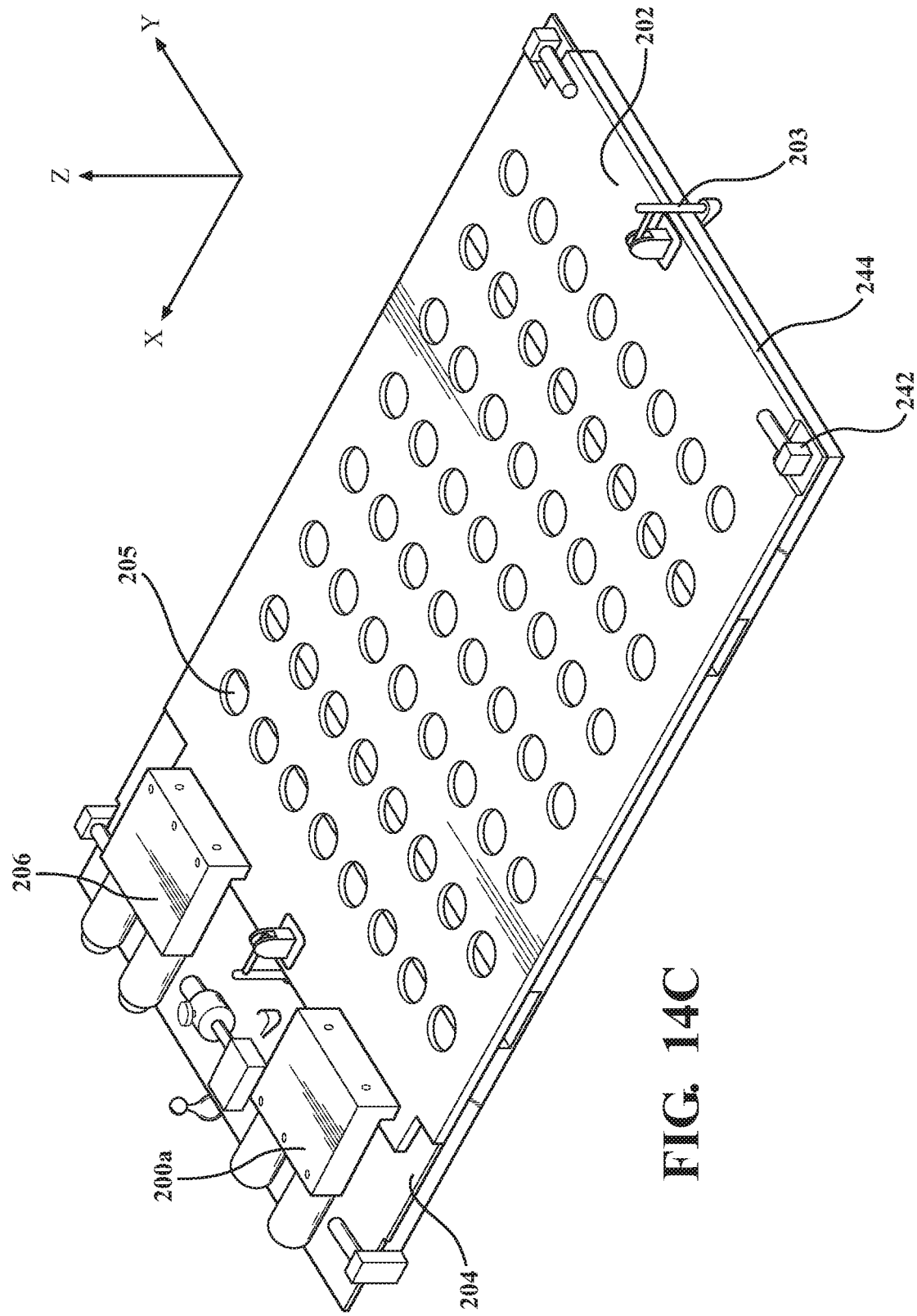
FIG. 14C is a perspective view of the upper and lower build plates of the apparatus of FIG. 14A in an orientation in which their respective openings are aligned to facilitate the removal of loose powder from the object build area.

FIG. 14B shows the telescoping retaining barrier 190 in a fully expanded configuration in which the upper flange 192 (which defines the upper surface of retaining barrier 190) is at its maximum distance from upper build plate 202 along the build (z) axis. Actuators 198a-198d (only 198a-198c are visible) are provided to move flange 192 along the build (z) axis from a retracted to expanded configuration and vice-versa. Each actuator 198a-198d has a corresponding shaft 206a-206b which is selectively extendable and retractable and which abuttingly engages a corresponding corner of flange 192. The telescoping retaining barrier 190 includes four sides 196a-196d (only 196a and 196d are visible). Three-dimensional object 193 is built on upper build plate 202 in the interior defined by the four sides 196a-196d of retaining barrier 190.

As shown in FIG. 14A, telescoping retaining barrier 190 is positioned over build plate 202 at the beginning of an object build process, although it could be configured otherwise. In the case of FIG. 14A, powder 48 is preferably deposited on build plate 202 to reach a height above the height h of the flange 192 relative to the build plate 202. The height of the powder is adjusted so that when the binder printhead 80 prints the binder liquid, the exposed surface of the object will be slightly above the flange 192 along the build (z) axis. Thus, the initial height of the powder is vertically spaced above flange 192 by a distance slightly greater than the object layer thickness $\Delta z$. This is done to ensure that the bottom of smoothing blade 76 and the binder printhead orifices 82 are a consistent distance from the exposed powder 48 surface 49 when solidifying each layer. As a result, however, the object will be built on a several layers of unbound powder 48.

After printing several layers of the object so that the exposed object surface 55 FIG. 1C) is above flange 192, the actuators 198a-198d are operated to extend the flange 192 by a specified vertical height increment along the build (z) axis. The increment is preferably set so that the position of flange 192 will remain below the solidified object surface (shown as dispensing plane 55 in FIG. 1C) throughout the build. Print engine 43 traverses the receiving area 61 (the x-y area defined by the inside of retaining barrier 190) to deposit additional powder 48, which is smoothed and leveled with smoothing blade 76. Binder printhead 80 prints binder liquid on the exposed powder surface 45 (FIG. 1C) in a pattern corresponding to the cross-sectional profile of the three-dimensional object at the current object height along the build (z) axis. The process repeats until the object 193 is complete, as illustrated in FIG. 14B.

FIG. 15C shows a side elevational view of retaining barrier 190 in a fully retracted configuration, and FIG. 15D shows a side elevational view of retaining barrier 190 in a fully expanded configuration. As best seen in FIGS. 15C and 15D, the individual panels 210c-226c comprising side 196c are "nested" so that when moving upward along the build (z) axis from the lowest panel 210c to the highest panel 226c, the panel length along the x-axis and the panel length across the y-axis decrease so that each panel can slide downward inwardly of the panel below it (except for panel 210c). The panels 210a-226a, 210b-226b, and 210d-226d (not shown) are configured similarly. As shown in FIG. 15E, corner pieces 211c-215c connect panels 210b-210c, 212b-212c and 214b-215c, etc. and are also nested in a similar fashion. Corner panels are similarly provided to connect side 196b to side 196d, sided 196d to 196a, and side 196a to side 196c.

In certain examples, one or more of the sides 196a-196d of retaining barrier 190 include a chain or cable to keep the individual panels from separating from one another as the retaining barrier 190 expands in height. As shown in FIGS. 15A-B, cables 231 and 233 are attached to connectors 228-234 on each panel of side 196c to connect the panels 210c-226c together. Similar connectors are provided for cable 233 and on the exterior of side 196d with two cables being provided on that wall as well.

The receiving surface 84 may further comprise a means of transporting powder 48 away from the receiving area 61. In an embodiment, a moveable build pallet may include a sliding gate in its surface comprising a stationary plate and a movable plate, both perforated by holes, and an actuator that causes the movable plate to shift, aligning the holes and allowing loose powder to drain through the surface of the plate. The receiving surface may further comprise a collection device and a powder conveyer to move powder from underneath the build pallet to a storage area for subsequent reuse, reprocessing, or disposal.

Apparatus 186 is designed to allow for the removal and recovery of loose sand that is not bound to form three-dimensional object 193. Upper build plate 202 includes openings 205, and lower build plate 204 includes openings 213 (not separately shown) which are selectively alignable with upper build plate openings 205 so that loose sand within the retaining barrier 190 may fall though both sets of holes into a reclamation container (not shown). Alternatively, a collection device and a powder conveyer may be provided to move powder from underneath the lower build plate 204 to a storage area for subsequent reuse, reprocessing, or disposal.

In FIG. 14A the upper build plate 202 and lower build plate 204 are in first relative positions along the conveyor travel (x) axis wherein the upper plate openings 205 and lower plate openings 213 (not shown) are not aligned. In this configuration, loose powder 48 (not shown) is confined within the sides 196*a*-196*d* of retaining barrier 190. Actuators 200*a* and 200*b* are provided and are connected to the upper build plate 202 (see FIG. 14*c*) to move the upper build plate 202 relative to the lower build plate 204 along the conveyor travel (x) axis. With the openings 205 of the upper build plate 202 and openings 213 (not shown) of lower build plate 204 aligned, loose powder falls though the openings and below lower build plate 204 where a collection device such as a box or other reclamation container may be provided. A latch 203 may be provided to secure a distal end 244 of upper build plate 202 to a distal end 242 of lower build plate 204 to keep the openings 205 and 213 aligned. When actuators 200*a* and 200*b* retract the upper plate 202 along the conveyor travel (x) axis, the latch 203 disengages from lower plate 204, and openings 205 and 213 (not shown) move out of alignment into the configuration shown in FIG. 14A in which the distal end 244 of the upper build plate 202 is spaced apart from the distal end 242 of the lower build plate 204 along the conveyor travel (x) axis.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method of forming a three-dimensional object, comprising: providing a receiving surface having an object build area; providing an extendable retaining barrier having a top surface, wherein the extendable retaining barrier is adjacent the object build area; extending the top surface of the extendable retaining barrier by a retaining barrier height increment along the build axis in a direction away from the receiving surface such that the top surface has a vertical position along the build axis; and dispensing a powder within a dispensing plane to define a layer of powder having an object layer thickness, wherein the layer of powder has an exposed surface that defines a print plane and which has a vertical position along the build axis which is above the vertical position of the top surface of the extendable retaining barrier along the build axis, and wherein the retaining barrier height increment is greater than the object layer thickness, and wherein the retaining barrier does not comprise the powder.

2. The method of claim 1, further comprising retracting the top surface of the retaining barrier in a direction toward the receiving surface.

3. The method of claim 1, further comprising solidifying the dispensed powder in a pattern corresponding to a portion of the three-dimensional object.

4. The method of claim 3, wherein the step of solidifying the layer of dispensed powder in a pattern corresponding to a portion of the three-dimensional object comprises dispensing a liquid binder in the pattern corresponding to a portion of the three-dimensional object.

5. The method of claim 3, wherein the step of solidifying the layer of dispensed powder in a pattern corresponding to a portion of the three-dimensional object comprises applying heat in the pattern corresponding to a portion of the three-dimensional object.

6. The method of claim 3, wherein the retaining barrier is a primary retaining barrier, and the method further comprises solidifying a portion of the layer of dispensed powder into a solidified powder secondary retaining barrier.

7. The method of claim 1, wherein the extendable retaining barrier fully encircles the dispensed powder.

8. The method of claim 1, further comprising leveling the layer of dispensed powder.

9. The method of claim 1, wherein the receiving surface comprises an upper plate with a first plurality of openings, and a lower plate with a second plurality of openings, and the method further comprises adjusting the position of the first plate relative to the second plate to selectively align the first plurality of openings and the second plurality of openings, thereby causing loose powder to fall through the second plurality of openings.

10. A method of forming a three-dimensional object, comprising: providing a receiving surface having an object build area; providing a partially erected retaining barrier such that the retaining barrier has an upper surface at a first specified height from the receiving surface along a build axis, wherein the retaining barrier at least partially encloses the object build area; first dispensing a powder within a dispensing plane above the upper surface of the partially erected retaining barrier; first solidifying the dispensed powder in a pattern that corresponds to a first portion of the three-dimensional object; continuing to erect the retaining barrier such that the retaining barrier upper surface is at a second specified height from the receiving surface along the build axis, wherein the second specified height is greater than the first specified height by a retaining barrier height increment; second dispensing a powder within the object build area to create an exposed surface of powder above the upper surface of the partially erected retaining barrier; and second solidifying the dispensed powder in a pattern that corresponds to a second portion of the three-dimensional object, wherein the partially erected retaining barrier does not comprise the powder, and the step of continuing to erect the retaining barrier does not comprise continuing to erect the retaining barrier with the powder.

11. The method of claim 10, wherein the step of first dispensing the powder within the dispensing plane above the upper surface of the partially erected retaining barrier defines a first layer of the powder having an object layer thickness, the step of second dispensing the powder within the object build area to create the exposed surface of powder above the upper surface of the partially erected retaining barrier defines a second layer of the powder having the object layer thickness, and wherein the retaining barrier height increment is greater than the object layer thickness.

12. The method of claim 10, wherein the step of first dispensing the powder within the dispensing plane above the upper surface of the partially erected retaining barrier defines a first layer of the powder having an object layer thickness, the step of second dispensing the powder within the object build area to create the exposed surface of powder above the upper surface of the partially erected retaining barrier defines a second layer of the powder having the object layer thickness, and the step of continuing to erect a retaining barrier comprises expanding the height of a collapsible enclosure comprised of telescoping, horizontal panels along the build axis, and wherein the retaining barrier height increment is greater than the object layer thickness.

13. The method of claim 10, wherein the retaining barrier is a primary retaining barrier, and the method further comprises solidifying the dispensed powder in a pattern corresponding to a secondary retaining barrier.

* * * * *